United States Patent
Yu et al.

(10) Patent No.: US 11,063,642 B2
(45) Date of Patent: Jul. 13, 2021

(54) APPARATUS AND METHOD FOR PRECODING DATA IN WIRELESS COMMUNICATION SYSTEM

(71) Applicant: Samsung Electronics Co., Ltd., Suwon-si (KR)

(72) Inventors: Hyoungyoul Yu, Suwon-si (KR); Kyoung Heo, Suwon-si (KR); Hyunjoo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

(21) Appl. No.: 17/016,287

(22) Filed: Sep. 9, 2020

(65) Prior Publication Data

US 2021/0075479 A1 Mar. 11, 2021

(30) Foreign Application Priority Data

Sep. 11, 2019 (KR) .......................... 10-2019-0113053

(51) Int. Cl.
*H04B 7/0456* (2017.01)
*H04L 25/02* (2006.01)

(52) U.S. Cl.
CPC ....... *H04B 7/0456* (2013.01); *H04L 25/0228* (2013.01)

(58) Field of Classification Search
CPC .......................... H04B 7/0456; H04L 25/0228
USPC .......................................... 375/267; 370/329
See application file for complete search history.

(56) References Cited

U.S. PATENT DOCUMENTS

| | | | |
|---|---|---|---|
| 8,050,357 B2 | 11/2011 | Clerckx et al. | |
| 8,259,836 B2 | 9/2012 | Xia et al. | |
| 8,498,356 B2 | 7/2013 | Clerckx et al. | |
| 9,184,952 B2 | 11/2015 | Wu et al. | |
| 10,469,146 B1* | 11/2019 | Ekbatani | H04B 7/0456 |
| 2014/0247860 A1 | 9/2014 | Zhu et al. | |
| 2014/0254533 A1* | 9/2014 | Kim | H04B 7/0413 370/329 |

OTHER PUBLICATIONS

"3rd Generation Partnership Project; Technical Specification Group Radio Access Network; NR; Physical layer procedures for data (Release 16)", 3GPP TS 38.214 V16.2.0 (Jun. 2020), 163 pages.

* cited by examiner

*Primary Examiner* — Fitwi Y Hailegiorgis

(57) ABSTRACT

The present disclosure relates to a pre-$5^{th}$-Generation (5G) or 5G communication system to be provided for supporting higher data rates beyond $4^{th}$-Generation (4G) communication system such as long-term evolution (LTE). An operation method of a base station in a wireless communication system may include obtaining indicators corresponding to a precoder, precoding a signal using the precoder, and transmitting the precoded signal to the terminal. The precoder may include elements defined by a phase value, an exponential value, or a sign, determined by combining variables based on the indicators. The precoder may be determined by searching a first memory storing coefficients for combining the variables corresponding to an antenna port and a layer, a second memory storing a size of a sine wave and cosine wave corresponding to the phase value, or a third memory storing a sign corresponding to a combination of an antenna port or a layer.

20 Claims, 10 Drawing Sheets

APPARATUS AND METHOD FOR PRECODING DATA IN WIRELESS COMMUNICATION SYSTEM

CROSS-REFERENCE TO RELATED APPLICATION

This application is based on and claims priority under 35 U.S.C. § 119 to Korean Patent Application No. 10-2019-0113053 filed on Sep. 11, 2019 in the Korean Intellectual Property Office, the disclosure of which is herein incorporated by reference in its entirety.

BACKGROUND

1. Field

The disclosure relates to a wireless communication system, and more particularly, to a method and apparatus for precoding data in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'beyond 4G network' or a 'post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In order to increase transmission or reception performance, a 4G system and a 5G system may use precoding technology. A matrix or a vector used for precoding is referred to as a precoder. A base station may calculate or search for an optimal precoder which is capable of increasing a reception success rate in a corresponding wireless channel environment, and may perform precoding. The base station may calculate a precoder by applying a channel estimated value in real time, or may select a precoder appropriate for a change in a channel among precoders having various predefined values. A set of predefined precoders in the latter case is referred to as a codebook. In this instance, the number of precoders included in the codebook is referred to as a codebook size.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide a method and apparatus for effectively precoding data in a wireless communication system.

Another aspect of the disclosure is to provide a method and apparatus for reducing the memory capacity needed for storing precoders in a wireless communication system.

Another aspect of the disclosure is to provide a method and apparatus for reducing the amount of time spent on determining a precoder in a wireless communication system.

According to various embodiments, an operation method of a base station in a wireless communication system may include obtaining a plurality of indicators corresponding to a precoder, precoding a signal transmitted to a terminal using the precoder, and transmitting the precoded signal to the terminal. The precoder may include a plurality of elements, and each of the plurality of elements may be defined by a combination of a phase value, an exponential value, and a sign, determined by combining variables determined based on the indicators. The precoder may be determined by searching at least one of a first memory that stores coefficients for combining the variables corresponding to an antenna port and a layer, a second memory that stores a size of a sine wave and a size of a cosine wave corresponding to the phase value, and a third memory that stores a sign corresponding to a combination of an antenna port and a layer.

According to various embodiments, a base station in a wireless communication system may include a transceiver and at least one processor connected to the transceiver. The at least one processor may be configured to obtain a plurality of indicators corresponding to a precoder, to precode a signal transmitted to a terminal using the precoder, and to transmit the precoded signal to the terminal. The precoder may include a plurality of elements. Each of the plurality of elements may be defined by a combination of a phase value, an exponential value, and a sign, determined by combining variables determined based on the indicators. The precoder may be determined by searching at least one of a first memory that stores coefficients for combining the variables corresponding to an antenna port and a layer, a second memory that stores a size of a sine wave and a size of a cosine wave corresponding to the phase value, and a third memory that stores a sign corresponding to a combination of an antenna port and a layer.

A method and apparatus according to various embodiments can promptly determine a precoder using a memory capacity smaller than the case in which all precoders included in a codebook are stored.

Effects obtainable from the disclosure may not be limited to the abovementioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
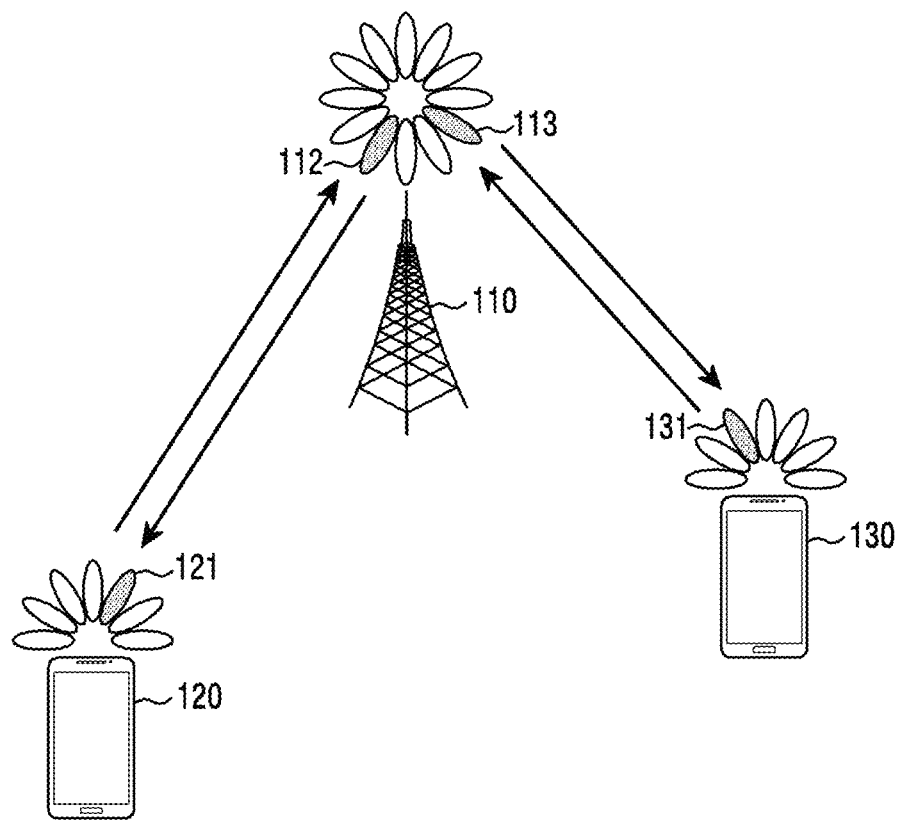
FIG. 1 is a diagram illustrating a wireless communication system according to various embodiments.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the disclosure are only used to describe specific embodiments and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

The disclosure provided below relates to a method and an apparatus for precoding data in a wireless communication system. Particularly, the disclosure describes technology for separating a precoder into multiple components and defining correspondence with input variables for each separated component.

Hereinafter, terms that refer to signals, terms that refer to channels, terms that refer to control information, terms that refer to network entities, terms that refer to elements of an apparatus, and the like are provided for ease of description. Therefore, the disclosure is not limited to the terms used in the descriptions, and other terms having the same technical meanings may be used.

In the disclosure, the terms "physical channel" and "signal" may be interchangeably used with "data" or "control signal". For example, although a physical downlink shared channel (PDSCH) is a term that refers to a physical channel via which data is transmitted, the PDSCH may be used as a term that refers to data. That is, in the disclosure, the expression "transmit a physical channel" may be understood as the same meaning as the expression "transmit data or a signal via a physical channel".

In the disclosure provided below, higher-layer signaling is a method of transferring a signal by a base station to a terminal using a downlink data channel in a physical layer or a method of transferring a signal by a terminal to a base station using an uplink data channel in a physical layer. Higher-layer signaling may be understood as radio resource control (RRC) signaling or a media access control (MAC) control element (CE).

Also, in the disclosure, the expressions, "greater than" or "less than" are used in order to determine whether a predetermined condition is satisfied or fulfilled. However, the expressions are merely used to express examples, and do not exclude the expressions "greater than or equal to" or "less than or equal to". A condition including the expression "greater than or equal to" may be replaced with a condition including the expression "greater than", a condition including the expression "less than or equal to" may be replaced with a condition including the expression "less than", and a condition including the expression "greater than or equal to and less than" may be replaced with a condition including the expression "greater than and less than or equal to".

Although the disclosure describes various embodiments using terms according to some communication standards (e.g., $3^{rd}$-generation partnership project (3GPP)), the embodiments are merely examples. Various embodiments may be easily modified and applied to other communication systems.

FIG. 1 is a diagram illustrating a wireless communication system according to various embodiments. FIG. 1 illustrates a base station 110, a terminal 120, and a terminal 130, as some of the nodes that use wireless channels in a wireless communication system. Although FIG. 1 illustrates a single base station, another base station which is the same as or similar to the base station 110 may be further included.

The base station 110 may be a network infrastructure that provides radio access to terminals 120 and 130. The base station 110 may have a coverage area defined by a predetermined geographical area based on the distance that the base station 110 is capable of transmitting a signal. The base station 110 may be referred to as an access point (AP), an eNodeB (eNB), a $5^{th}$-generation node (5G node), a next-generation nodeB (gNB), a wireless point, a transmission/reception point (TRP), or other terms having technical meaning equivalent thereto, in addition to "base station".

Each of the terminals 120 and 130 may be a device used by a user, and may perform communication with the base station 110 via a wireless channel. Depending on the case, at least one of the terminals 120 and 130 may operate without manipulation by a user. That is, at least one of the terminals 120 and 130 is a device that performs machine-type communication (MTC), and may not be carried by a user. Each of the terminals 120 and 130 may be referred to as a user equipment (UE), a mobile station, a subscriber station, a remote terminal, a wireless terminal, a user device, or other terms having meanings equivalent thereto, in addition to "terminal".

The base station 110, the terminal 120, and the terminal 130 may transmit and receive wireless signals in a millimeter-wave (mmWave) band (e.g., 28 GHz, 30 GHz, 38 GHz, and 60 GHz). In this instance, in order to improve a channel gain, the base station 110, the terminal 120, and the terminal 130 may perform beamforming. Here, the beamforming may include transmission beamforming and reception beamforming. That is, the base station 110, the terminal 120, and the terminal 130 may assign directivity to a transmission signal or a reception signal. To this end, the base station 110 and the terminals 120 and 130 may select serving beams 112, 113, 121, and 131 via a beam search procedure or a beam management procedure. After serving beams 112, 113, 121, and 131 are selected, subsequent communication may be performed using a resource which is in a quasi-co-located (QCL) relationship with the resource used for transmitting the serving beams 112, 113, 121, and 131.

If the large-scale characteristics of a channel that delivers a symbol on a first antenna port can be inferred from a channel that delivers a symbol on a second antenna port, it is estimated that the first antenna port and the second antenna port have a QCL relationship therebetween. For example, the large-scale characteristics may include at least one of a delay spread, a Doppler spread, a Doppler shift, an average gain, an average delay, and a spatial receiver parameter.

Figure 2:
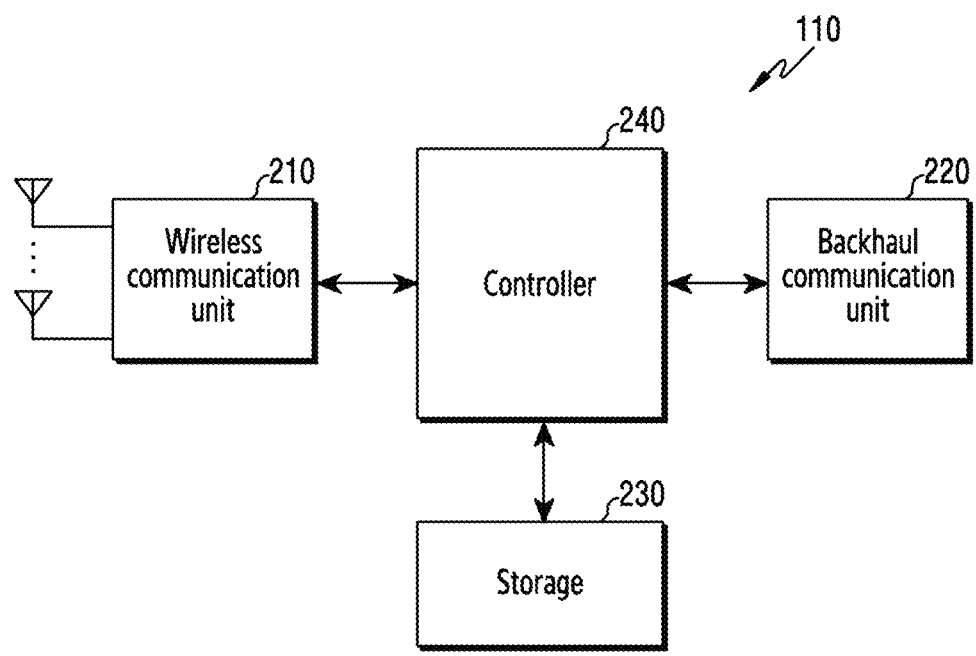
FIG. 2 is a block diagram illustrating the configuration of a base station in a wireless communication system according to various embodiments.

FIG. 2 is a block diagram illustrating the configuration of a base station in a wireless communication system according to various embodiments. The configuration of FIG. 2 may be understood as the configuration of the base station 110. The suffix of a word, "unit" or "er" used hereinafter may refer to a unit for processing at least one function or operation, and may be implemented as hardware, software, or a combination of hardware and software.

Referring to FIG. 2, the base station may include a wireless communication unit 210, a backhaul communication unit 220, a storage 230, and a controller 240.

The wireless communication unit 210 performs functions for transmitting or receiving signals via a wireless channel. For example, the wireless communication unit 210 performs a function of conversion between a baseband signal and a bitstream according to the physical-layer standard of the system. For example, in the case of data transmission, the wireless communication unit 210 generates complex symbols by encoding and modulating a transmission bitstream. Also, in the case of data reception, the wireless communication unit 210 restores a reception bitstream by demodulating and decoding a baseband signal.

Also, the wireless communication unit 210 up-converts a baseband signal into a radio-frequency (RF) band signal and transmits the same via an antenna, and down-converts an RF band signal received via an antenna into a baseband signal. To this end, the wireless communication unit 210 may include a transmission filter, a reception filter, an amplifier, a mixer, an oscillator, a digital-to-analog convertor (DAC), an analog-to-digital convertor (ADC), and the like. Also, the wireless communication unit 210 may include a plurality of transmission/reception paths. In addition, the wireless communication unit 210 may include at least one antenna array including a plurality of antenna elements.

From the perspective of hardware, the wireless communication unit 210 may be configured with a digital unit and an analog unit. The analog unit may include a plurality of sub-units depending on the operating power, an operating frequency, or the like. The digital unit may be implemented as at least one processor (e.g., a digital signal processor (DSP)).

The wireless communication unit 210 may transmit and receive signals as described above. Accordingly, all or part of the wireless communication unit 210 may be referred to as a "transmitter", "receiver", or "transceiver". Also, the transmission and reception performed via a wireless channel, which is described in the following descriptions, may be understood to include the case in which the above-described processing is performed by the wireless communication unit 210.

The backhaul communication unit 220 provides an interface for performing communication with other nodes within the network. That is, the backhaul communication unit 220 converts a bitstream transmitted from a base station to another node, for example, another access node, another base station, a higher node, a core network, or the like, into a physical signal, and converts a physical signal received from another node into a bitstream.

The storage 230 may store data, such as a basic program for operating a base station, an application, configuration information, and the like. The storage 230 may be implemented as volatile memory, non-volatile memory, or a combination of volatile memory and non-volatile memory. The storage 230 may provide data stored therein in response to a request from the controller 240.

The controller 240 controls the overall operation of the base station. For example, the controller 240 may transmit and receive signals via the wireless communication unit 210 or the backhaul communication unit 220. Further, the controller 240 records data in the storage 230 and reads the recorded data. The controller 240 may perform the functions of a protocol stack that the communication standard requires. Depending on the implementation, the protocol stack may be included in the wireless communication unit 210. To this end, the controller 240 may include at least one processor. According to various embodiments, the controller 240 may perform control so that a base station performs operations according to various embodiments described below.

Figure 3:
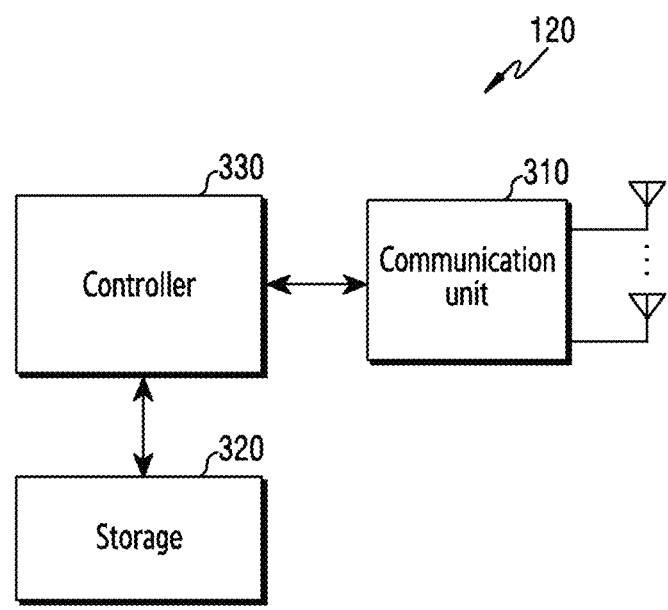
FIG. 3 is a block diagram illustrating the configuration of a terminal in a wireless communication system according to various embodiments.

FIG. 3 is a block diagram illustrating the configuration of a terminal in a wireless communication system according to various embodiments. The configuration illustrated in FIG. 3 may be understood as the configuration of the terminal 120. The end of a word, "unit" or "er" used hereinafter may refer to a unit for processing at least one function or operation, and may be implemented in hardware, software, or a combination of hardware and software.

Referring to FIG. 3, the terminal includes a communication unit 310, a storage 320, and a controller 330.

The communication unit 310 performs functions for transmitting or receiving signals via a wireless channel. For example, the communication unit 310 performs a function of conversion between a baseband signal and a bitstream according to the physical-layer standard of the system. For example, in the case of data transmission, the communication unit 310 generates complex symbols by encoding and modulating a transmission bitstream. Also, in the case of data reception, the communication unit 310 restores a reception bitstream by demodulating and decoding a baseband signal. The communication unit 310 up-converts a baseband signal into an RF band signal and transmits the same via an antenna, and down-converts an RF band signal received via an antenna into a baseband signal. For example, the communication unit 310 may include a transmission filter, a reception filter, an amplifier, a mixer, an oscillator, a DAC, an ADC, and the like.

Also, the communication unit 310 may include a plurality of transmission/reception paths. In addition, the communication unit 310 may include at least one antenna array including a plurality of antenna elements. From the perspective of hardware, the communication unit 310 may include a digital circuit and an analog circuit (e.g., a radio-frequency integrated circuit (RFIC)). Here, the digital circuit and the analog circuit may be implemented as a single package. Also, the communication unit 310 may include a plurality of RF chains. In addition, the communication unit 310 may perform beamforming.

The communication unit 310 may transmit and receive signals as described above. Accordingly, all or part of the communication unit 310 may be referred to as a "transmitter", "receiver", or "transceiver". The transmission and reception performed via a wireless channel, which is described in the following descriptions, may be understood to include the case in which the above-described processing is performed by the communication unit 310.

The storage 320 may store data, such as a basic program, an application, configuration information, and the like for operating a terminal. The storage 320 may be implemented as volatile memory, non-volatile memory, or a combination of volatile memory and non-volatile memory. The storage 320 may provide data stored therein in response to a request from the controller 330.

The controller 330 may control the overall operation of a terminal. For example, the controller 330 may perform signal transmission and reception via the communication unit 310. Further, the controller 330 records data in the storage 320 and reads the recorded data. The controller 330 may perform the functions of a protocol stack that the communication standard requires. To this end, the controller 330 may include at least one processor or microprocessor, or may be a part of the processor. Also, a part of the communication unit 310 and the controller 330 may be referred to as a communication processor (CP). According to various embodiments, the controller 330 may perform control so that a terminal performs operations according to various embodiments described below.

Figure 4:
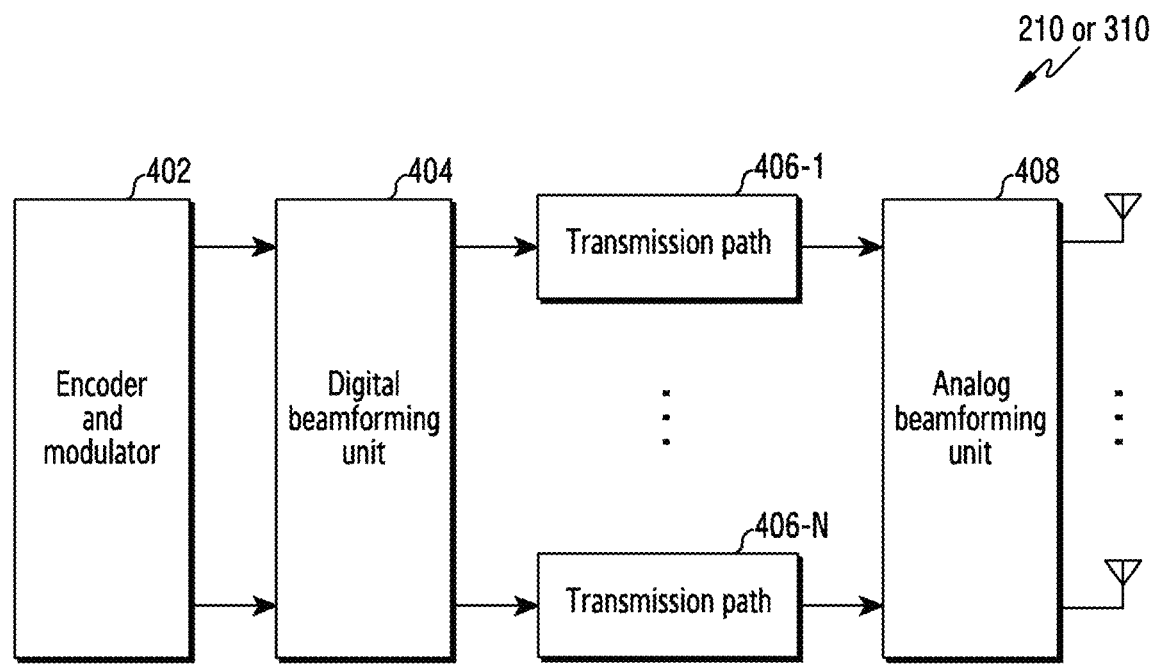
FIG. 4 is a block diagram illustrating the configuration of a communication unit in a wireless communication system according to various embodiments.

FIG. 4 is a block diagram illustrating the configuration of a communication unit in a wireless communication system according to various embodiments. FIG. 4 illustrates an example of the detailed configuration of the wireless communication unit 210 of FIG. 2 or the communication unit 310 of FIG. 3. Particularly, FIG. 4 illustrates components for performing beamforming, which correspond to a part of the wireless communication unit 210 of FIG. 2 or the communication unit 310 of FIG. 3.

Referring to FIG. 4, the wireless communication unit 210 or the communication unit 310 may include an encoder and modulator 402, a digital beamforming unit 404, a plurality of transmission paths 406-1 to 406-N, and an analog beamforming unit 408.

The encoder and modulator 402 may perform channel encoding. To perform channel encoding, at least one of a low-density parity check (LDPC) code, a convolution code, and a polar code may be used. The encoder and modulator 402 may perform constellation mapping so as to generate modulated symbols.

The digital beamforming unit 404 may perform beamforming of a digital signal (e.g., modulated symbols). To this end, the digital beamforming unit 404 may multiply the modulated symbols by beamforming weights. Here, the beamforming weights may be used to change the size and phase of a signal and may be referred to as a "precoding matrix," "precoder," or the like. The digital beamforming unit 404 may output digitally beamformed modulated symbols to the plurality of transmission paths 406-1 to 406-N In this instance, according to a multiple-input-multiple output (MIMO) transmission scheme, the modulated symbols may be multiplexed, or the same modulated symbols may be provided to the plurality of transmission paths 406-1 to 406-N.

The plurality of transmission paths 406-1 to 406-N may convert the digitally beamformed digital signals into analog signals. To this end, each of the plurality of transmission paths 406-1 to 406-N may include an inverse fast Fourier transform (IFFT) operation unit, a cyclic prefix (CP) insertion unit, a DAC, and an up-converter. The CP insertion unit is used for an orthogonal frequency-division multiplexing (OFDM) scheme and may be excluded if another physical-layer scheme (e.g., filter bank multi-carrier (FBMC)) is applied. That is, the plurality of transmission paths 406-1 to 406-N may provide an independent signal-processing process with respect to a plurality of streams generated by digital beamforming. Depending on the implementation, some of the components of the plurality of transmission paths 406-1 to 406-N may be used in common.

The analog beamforming unit 408 may perform beamforming with respect to analog signals. To this end, the digital beamforming unit 408 may multiply analog signals by beamforming weights. Here, the beamforming weights may be used to change the size and phase of signals. Particularly, depending on the connection structure between the plurality of transmission paths 406-1 to 406-N and antennas, the analog beamforming unit 408 may be variously implemented. For example, each of the plurality of transmission paths 406-1 to 406-N may be connected to a single antenna array. As another example, the plurality of transmission paths 406-1 to 406-N may be connected to a single antenna array. As another example, the plurality of transmission paths 406-1 to 406-N may be adaptively connected to a single antenna array or to two or more antenna arrays.

Precoding may be performed using the structure of FIG. 4. According to various embodiments, precoding may be performed based on a codebook. In order to perform precoding, a precoder appropriate for a channel between a base station and a terminal may be selected by the base station or the terminal. Hereinafter, examples of the structures of a base station and a terminal according to various schemes, such as channel estimation, selecting a precoder, and the like, will be described.

Figure 5A:
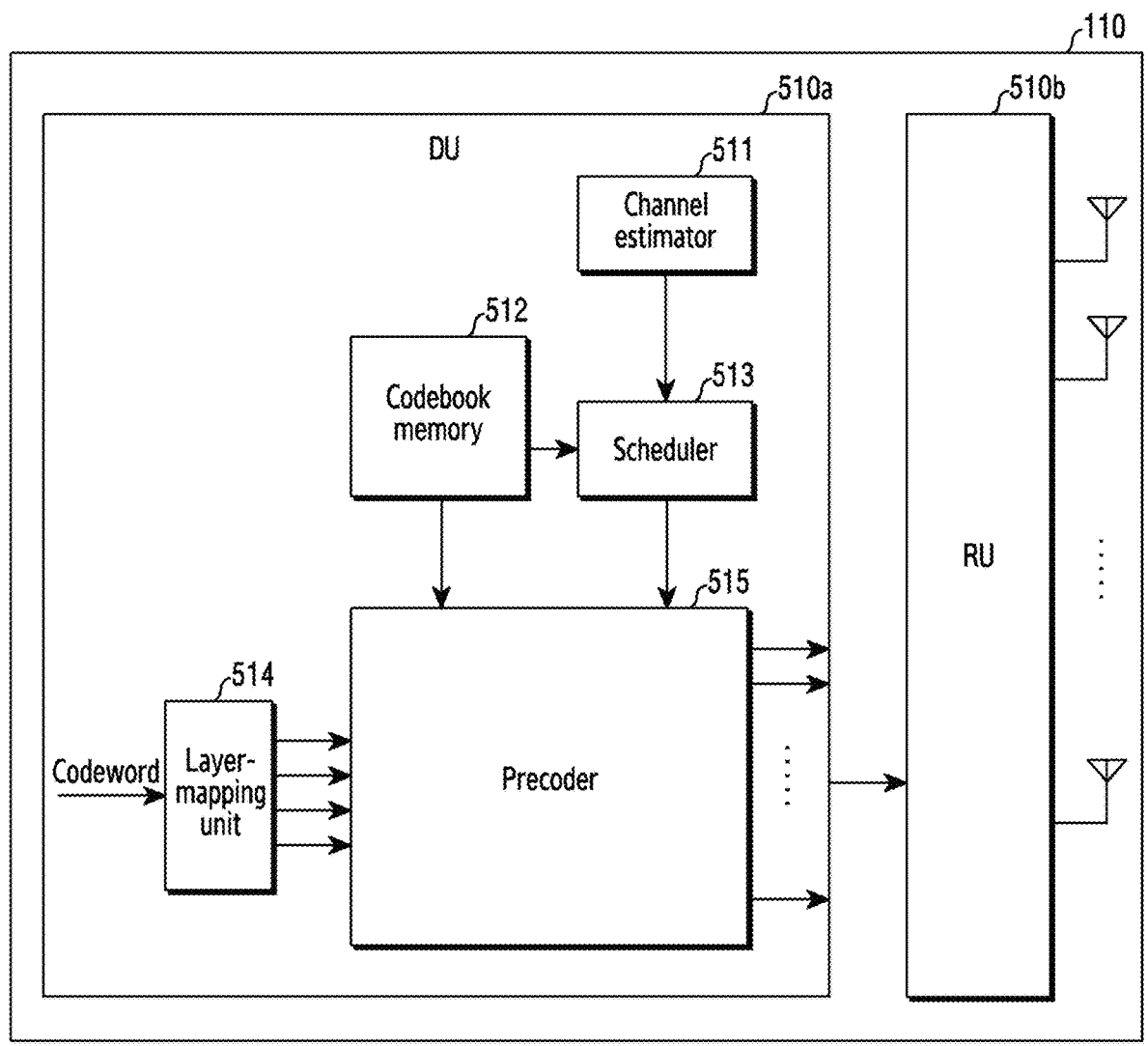
FIG. 5A is a block diagram illustrating an example of the functional structure of a base station and a terminal for performing precoding in a wireless communication system according to various embodiments.
Figure 5B:
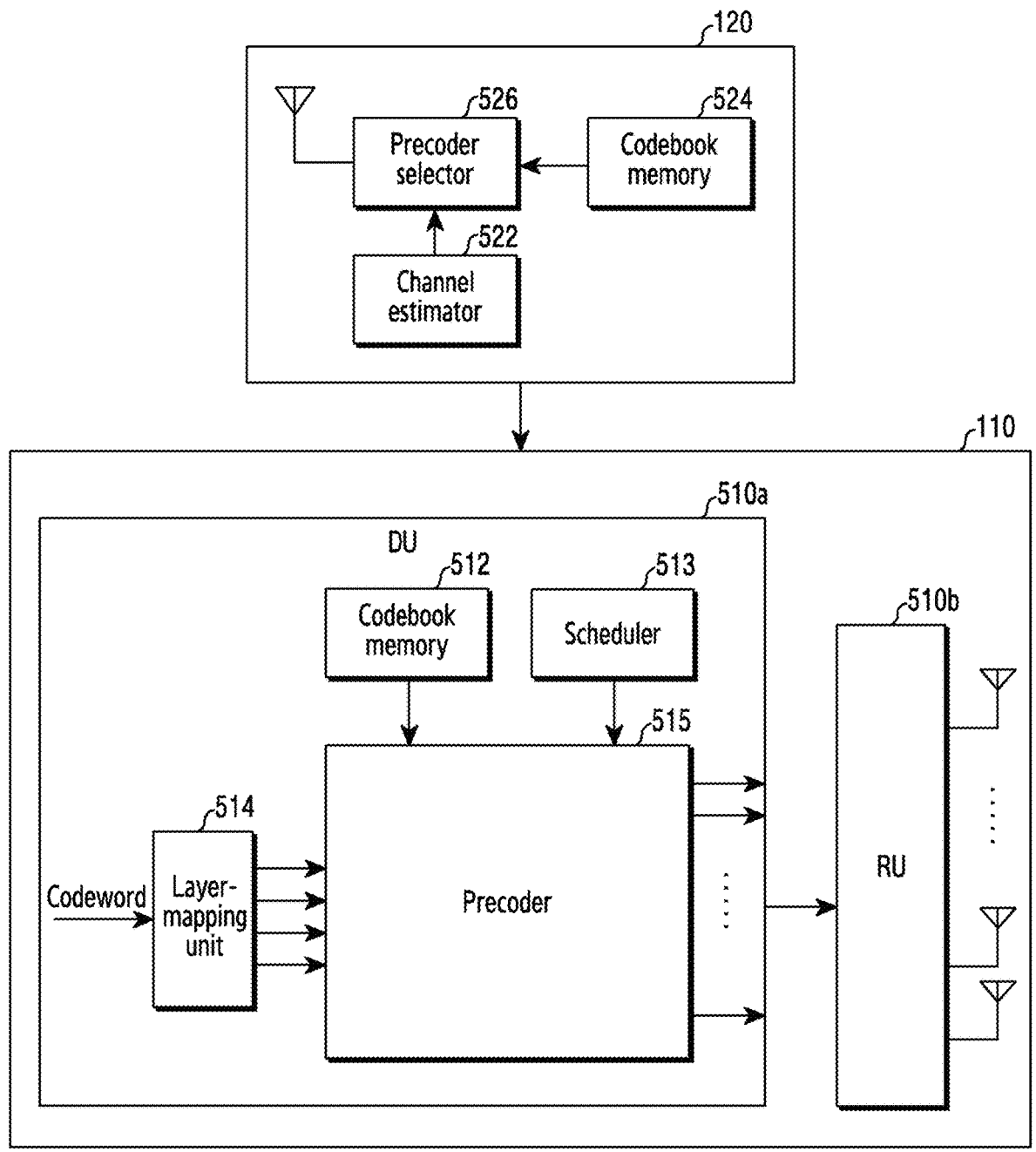
FIG. 5B is a block diagram illustrating another example of the functional structure of a base station and a terminal for performing precoding in a wireless communication system according to various embodiments.
Figure 5C:
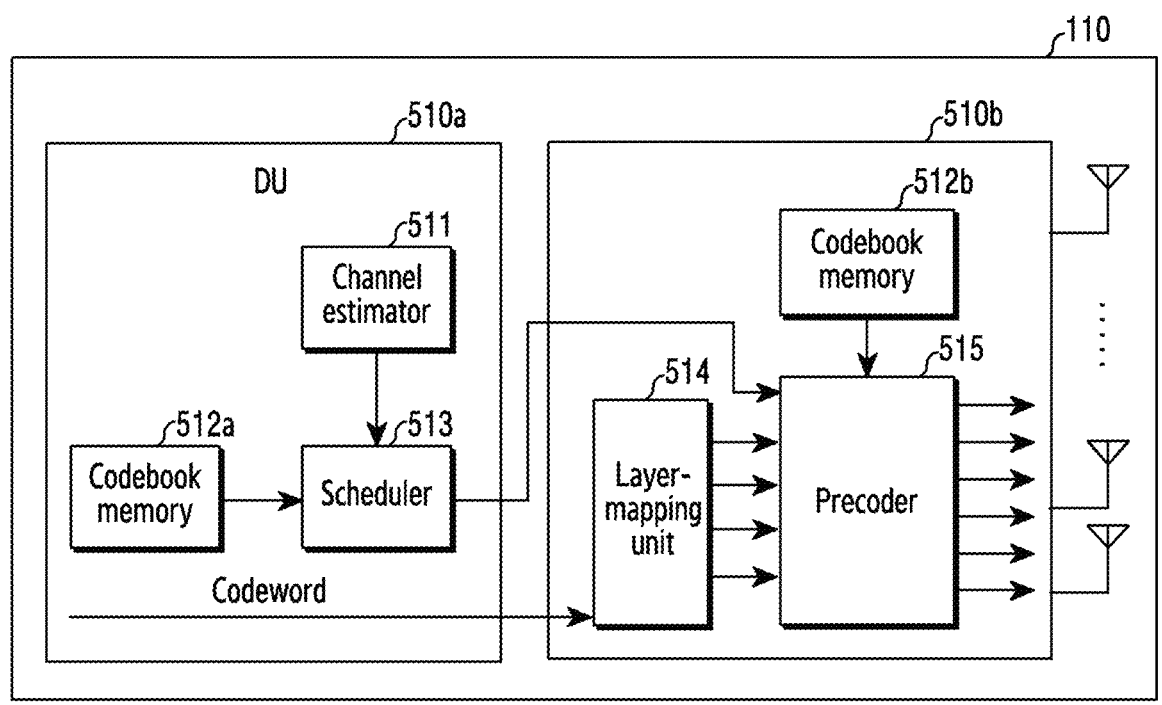
FIG. 5C is a block diagram illustrating another example of the functional structure of a base station and a terminal for performing precoding in a wireless communication system according to various embodiments.

FIGS. 5A to 5C are block diagrams illustrating the functional structure of at least one of a base station and a terminal for precoding.

Referring to FIGS. 5A to 5C, the base station 110 may include a digital unit (DU) 510a and a radio unit (RU) 510b. In FIGS. 5A to 5C, although a single RU 510b is illustrated, the DU 510a may be connected to a plurality of RUs. The connection between the DU 510a and the RU 510b may be based on a common public radio interface (CPRI).

The DU 510a or the RU 510b may include at least one of a channel estimator 511, a codebook memory 512, a scheduler 513, a layer-mapping unit 514, and a precoder 515.

The channel estimator 511 may estimate a channel between the base station 110 and the terminal 120. To this end, the base station 110 may receive an uplink reference signal (e.g., a sounding reference signal (SRS)) or may transmit a downlink reference signal (e.g., a common reference signal (CSR), a channel state information (CSI)-reference signal (RS), or the like).

The codebook memory 512 may be storage that stores at least one codebook including predefined precoders. The codebook memory 512 may provide, to the scheduler 513, at least one precoder needed for scheduling. According to an indication from the scheduler 513, the codebook memory 512 may provide, to the precoder 515, at least one precoder for precoding data.

The scheduler 513 may select a precoder for precoding data. To this end, the scheduler 513 may obtain channel information, or may obtain information reported from the terminal 120. The channel information may include coefficients associated with a MIMO channel between the base station 110 and the terminal 120, and the reported information may include information (e.g., at least one precoding matrix indicator (PMI)) indicating a precoder.

The layer-mapping unit 514 may map at least one codeword including transmission data to a plurality of layers. In this instance, the number of layers may be dependent on a selected precoder. That is, the layer-mapping unit 514 may divide at least one codeword into streams, the number of which corresponds to the selected precoder, and may provide the same to the precoder 515. In other words, the layer-mapping unit 514 may provide data mapped to layers (layered data) to the precoder 515.

The precoder 515 may perform precoding of the layered data. The precoder 515 may perform precoding of data by multiplying the same by the precoder determined by the scheduler 513 and provided from the codebook memory 512. Accordingly, precoded data streams are generated.

The above-mentioned channel estimator 511, the codebook memory 512, the scheduler 513, the layer-mapping unit 514, and the precoder 515 may be disposed variously depending on the detailed embodiment. Hereinafter, various examples of the functional structure of a base station and a terminal will be described with reference to FIGS. 5A to 5C.

FIG. 5A is a diagram illustrating an example of the functional structure of the base station 110 and the terminal 120 for performing precoding in a wireless communication system according to various embodiments.

Referring to FIG. 5A, the DU 510a may include the channel estimator 511, the codebook memory 512, the scheduler 513, the layer-mapping unit 514, and the precoder 515, so as to perform channel estimation, codebook generation, precoder search, and precoding. Subsequently, the DU 510a may transfer precoded data to the RU 510b, and the RU 510b may perform analog conversion and RF up-conversion with respect to the precoded data and may transmit the data via antennas.

FIG. 5B is a diagram illustrating another example of the functional structure of the base station 110 and the terminal 120 for performing precoding in a wireless communication system according to various embodiments. FIG. 5B illustrates the structure in which the terminal 120 selects a precoder.

Referring to FIG. 5B, the terminal 120 may include a channel estimator 522, a codebook memory 524, and a precoder selector 526. The channel estimator 522 may estimate a channel using a reference signal transmitted from the base station 110. The codebook memory 524 may store at least one codebook stored in the codebook memory 512 and may provide precoders to the precoder selector 526. The precoder selector 526 may select a precoder based on channel information associated with a channel between the base station 110 and the terminal 120. Information indicating the precoder selected by the precoder selector 526 may be reported to the base station 110 periodically or aperiodically.

The DU 510a may include the codebook memory 512, the scheduler 513, the layer-mapping unit 514, and the precoder 515 so as to perform codebook generation, precoder search, and precoding. In this instance, unlike the example of FIG. 5A, the scheduler 513 of the DU 510a may select a precoder based on information reported from the terminal 120, without performing channel estimation. For example, the scheduler 513 may select a precoder indicated by the reported information. As another example, by taking into consideration a channel state, the relationship with other terminals, or the like, the scheduler 513 may select a precoder which is different from the precoder indicated by the reported information.

Particularly, if the terminal 120 reports information indicating a rank-4 precoder even though the terminal 120 is located in a shadow area, the scheduler 513 may determine that 4-layer transmission in a poor channel state is a waste of transmission resources. In this instance, the scheduler 513 may determine to perform 1-layer transmission and may select a precoder corresponding to rank-1. Subsequently, the DU 510a may transfer precoded data to the RU 510b, and the RU 510b may perform analog conversion, RF up-conversion, and the like with respect to the precoded data, and may transmit the data via antennas.

FIG. 5C is a diagram illustrating another example of the functional structure of the base station 110 and the terminal 120 for performing precoding in a wireless communication system according to various embodiments. FIG. 5C illustrates the structure in which precoding is performed by the RU 510b. That is, FIG. 5C illustrates the case in which some functions of the DU 510a in the example of FIG. 5A are transferred to the RU 510b.

Referring to FIG. 5C, the DU 510a may include the channel estimator 511, a codebook memory 512a, and the scheduler 513, so as to perform channel estimation, codebook generation, and precoder search. The RU 510b may include a codebook memory 512b, the layer-mapping unit 514, and the precoder 515, and may perform layer mapping and precoding. The codebook memory 512a and the codebook memory 512b may store and provide at least one codebook stored in the codebook memory 512. Since precoding is performed by the RU 510b, data before precoding may be transferred from the DU 510a to the RU 510b. Accordingly, the burden with regard to the size of a transmission between the DU 510a and the RU 510b may be decreased.

In FIG. 5C, the DU 510a may include the channel estimator 511. However, according to another embodiment, the channel estimator 511 may be excluded, and information indicating a precoder may be reported by the terminal 120, as illustrated in FIG. 5B.

As described above, precoding may be performed on data. Precoding may be understood to be an operation of multiplying data symbols by the coefficients of a precoder. A detailed example of precoding will be described with reference to equations provided below.

Precoding may be mathematically expressed as shown in Equation 1 provided below.

$$\begin{bmatrix} y_0 \\ y_1 \\ y_2 \\ \vdots \\ y_{nT-1} \end{bmatrix}_{nT \times 1} = \begin{bmatrix} w_{0,0} & w_{0,1} & w_{0,2} & \cdots & w_{0,nL-1} \\ w_{1,0} & w_{1,1} & w_{1,2} & \cdots & w_{1,nL-1} \\ w_{2,0} & w_{2,1} & w_{2,2} & \cdots & w_{2,nL-1} \\ \vdots & \vdots & \vdots & \ddots & \vdots \\ w_{nT-1,0} & w_{nT-1,1} & w_{nT-1,2} & \cdots & w_{nT-1,nL-1} \end{bmatrix}_{nT \times nL} \begin{bmatrix} s_0 \\ s_1 \\ s_2 \\ \vdots \\ s_{nL-1} \end{bmatrix}_{nL \times 1}$$

[Equation 1]

In Equation 1, $y_n$ denotes a signal transmitted via an $n^{th}$ port among precoded signals, nT denotes the number of transmission ports, $w_{n,m}$ denotes a coefficient located at the $n^{th}$ row and $m^{th}$ column of a precoder, $s_m$ denotes a symbol located in an $m^{th}$ layer among transmission symbols, and nL denotes the number of layers. As shown in Equation 1, nL data symbols are transmitted simultaneously via nT antenna ports, and conversion between data symbols and transmission signals may be performed by a precoder including nT×nL coefficients.

A scheme of defining a precoder may differ depending on the communication standard. For example, in the case of a $5^{th}$-generation (5G) new radio (NR), a codebook provided in the form of discrete Fourier transform (DFT), in which elements of a precoder are in the form of $exp(j2\pi\theta)$, may be used for single-user (SU) MIMO. Hereinafter, Table 1 to Table 9 are codebooks defined in technical specification (TS) 38.214, which is the 5G NR standard document, and are codebook generation formulas in a codebook mode 1 for transmission according to one of layer 1 to layer 4. Hereinafter, in Table 1 to Table 9, $N_1$ and $N_2$ indicate the configuration associated with an antenna shape, and $P_{CSI-RS}$ is the number of antenna ports, and $P_{CSI-RS}=N_1 \times N_2$. $i_{1,1}$, $i_{1,2}$, $i_{1,3}$, $i_2$ are PMIs provided from a higher layer.

Table 1 lists $N_1$ and $N_2$, which are the number of vertical and horizontal antenna ports, and $O_1$ and $O_2$, which are oversampling factors, according to the number of supportable antenna ports.

TABLE 1

| Number of CSI-RS antenna ports, $P_{CSI-RS}$ | $(N_1, N_2)$ | $(O_1, O_2)$ |
| --- | --- | --- |
| 4 | (2, 1) | (4, 1) |
| 8 | (2, 2) | (4, 4) |
|  | (4, 1) | (4, 1) |
| 12 | (3, 2) | (4, 4) |
|  | (6, 1) | (4, 1) |
| 16 | (4, 2) | (4, 4) |
|  | (8, 1) | (4, 1) |
| 24 | (4, 3) | (4, 4) |
|  | (6, 2) | (4, 4) |
|  | (12, 1) | (4, 1) |
| 32 | (4, 4) | (4, 4) |
|  | (8, 2) | (4, 4) |
|  | (16, 1) | (4, 1) |

Table 2 shows mapping between PMI $i_{1,3}$ and variable $k_n$ in association with 2-layer CSI reporting.

TABLE 2

| | $N_1 > N_2 > 1$ | | $N_1 = N_2$ | | $N_1 = 2, N_2 = 1$ | | $N_1 > 2, N_2 = 1$ | |
| --- | --- | --- | --- | --- | --- | --- | --- | --- |
| $i_{1,3}$ | $k_1$ | $k_2$ | $k_1$ | $k_2$ | $k_1$ | $k_2$ | $k_1$ | $k_2$ |
| 0 | 0 | 0 | 0 | 0 | 0 | 0 | 0 | 0 |
| 1 | $O_1$ | 0 | $O_1$ | 0 | $O_1$ | 0 | $O_1$ | 0 |
| 2 | 0 | $O_2$ | 0 | $O_2$ | | | $2O_1$ | 0 |
| 3 | $2O_1$ | 0 | $O_1$ | $O_2$ | | | $3O_1$ | 0 |

Table 3 shows mapping between PMI $i_{1,3}$ and variable $k_n$ in association with 3-layer or 4-layer CSI reporting.

TABLE 3

| | $N_1 = 2,$ $N_2 = 1$ | | $N_1 = 4,$ $N_2 = 1$ | | $N_1 = 6,$ $N_2 = 1$ | | $N_1 = 2,$ $N_2 = 2$ | | $N_1 = 3,$ $N_2 = 2$ | |
| --- | --- | --- | --- | --- | --- | --- | --- | --- | --- | --- |
| $i_{1,3}$ | $k_1$ | $k_2$ | $k_1$ | $k_2$ | $k_1$ | $k_2$ | $k_1$ | $k_2$ | $k_1$ | $k_2$ |
| 0 | $O_1$ | 0 | $O_1$ | 0 | $O_1$ | 0 | $O_1$ | 0 | $O_1$ | 0 |
| 1 | | | $2O_1$ | 0 | $2O_1$ | 0 | 0 | $O_2$ | 0 | $O_2$ |
| 2 | | | $3O_1$ | 0 | $3O_1$ | 0 | $O_1$ | $O_2$ | $O_1$ | $O_2$ |
| 3 | | | | | $4O_1$ | 0 | | | $2O_1$ | 0 |

Table 4 is a codebook for 1-layer CSI reporting.

TABLE 4 codebookMode = 1

| $i_{1,1}$ | $i_{1,2}$ | $i_2$ | |
|---|---|---|---|
| $0,1,\ldots,N_1O_1-1$ | $0,\ldots,N_2O_2-1$ | $0,1,2,3$ | $W_{i_{1,1},i_{1,2},i_2}^{(1)}$ | where $W_{l,m,n}^{(1)} = \dfrac{1}{\sqrt{P_{CSI-RS}}} \begin{bmatrix} v_{l,m} \\ \varphi_n v_{l,m} \end{bmatrix}$.

Table 5 is a codebook for 2-layer CSI reporting.

TABLE 5 codebookMode = 1

| $i_{1,1}$ | $i_{1,2}$ | $i_2$ | |
|---|---|---|---|
| $0,1,\ldots,N_1O_1-1$ | $0,\ldots,N_2O_2-1$ | $0,1$ | $W_{i_{1,1},i_{1,1}+k_1,i_{1,2},i_{1,2}+k_2,i_2}^{(2)}$ | where $W_{l,l',m,m',n}^{(2)} = \dfrac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$.

and the mapping from $i_{1,3}$ to $k_1$ and $k_2$ is given in Table 5.2.2.2.1-3.

Table 6 is a codebook for 3-layer CSI reporting when less than 16 antenna ports are used.

TABLE 6 codebookMode = 1-2, $P_{CSI-RS} < 16$

| $i_{1,1}$ | $i_{1,2}$ | $i_2$ | |
|---|---|---|---|
| $0,\ldots,N_1O_1-1$ | $0,1,\ldots,N_2O_2-1$ | $0,1$ | $W_{i_{1,1},i_{1,1}+k_1,i_{1,2},i_{1,2}+k_2,i_2}^{(3)}$ | where $W_{l,l',m,m',n}^{(3)} = \dfrac{1}{\sqrt{3P_{CSI-RS}}} \begin{bmatrix} v_{l,m} & v_{l',m'} & v_{l,m} \\ \varphi_n v_{l,m} & \varphi_n v_{l',m'} & -\varphi_n v_{l,m} \end{bmatrix}$.

and the mapping from $i_{1,3}$ to $k_1$ and $k_2$ is given in Table 5.2.2.2.1-4.

Table 7 is a codebook for 3-layer CSI reporting when 16 or more antenna ports are used.

TABLE 7 codebookMode = 1-2, $P_{CSI-RS} \geq 16$

| $i_{1,1}$ | $i_{1,2}$ | $i_{1,3}$ | $i_2$ | |
|---|---|---|---|---|
| $0,\ldots,\dfrac{N_1O_1}{2}-1$ | $0,\ldots,N_2O_2-1$ | $0,1,2,3$ | $0,1$ | $W_{i_{1,1},i_{1,2},i_{1,3},i_2}^{(3)}$ | where $W_{l,m,p,n}^{(3)} = \dfrac{1}{\sqrt{3P_{CSI-RS}}} \begin{bmatrix} \tilde{v}_{l,m} & \tilde{v}_{l,m} & \tilde{v}_{l,m} \\ \theta_p \tilde{v}_{l,m} & -\theta_p \tilde{v}_{l,m} & \theta_p \tilde{v}_{l,m} \\ \varphi_n \tilde{v}_{l,m} & -\varphi_n \tilde{v}_{l,m} & \varphi_n \tilde{v}_{l,m} \\ \varphi_n \theta_p \tilde{v}_{l,m} & -\varphi_n \theta_p \tilde{v}_{l,m} & \varphi_n \theta_p \tilde{v}_{l,m} \end{bmatrix}$.

Table 8 is a codebook for 4-layer CSI reporting when less than 16 antenna ports are used.

TABLE 8 codebookMode = 1-2, $P_{CSI-RS} < 16$

| $i_{1,1}$ | $I_{1,2}$ | $I_2$ | |
|---|---|---|---|
| $0,\ldots,N_1O_1-1$ | $0,1,\ldots,N_2O_2-1$ | $0,1$ | $W_{i_{1,1},i_{1,1}+k_1,i_{1,2},i_{1,2}+k_2,i_2}^{(4)}$ | where $W_{l,l',m,m',n}^{(4)} =$ $\dfrac{1}{\sqrt{4P_{CSI-RS}}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$.

and the mapping from $i_{1,3}$ to $k_1$ and $k_2$ is given in Table 5.2.2.2.1-4.

Table 9 is a codebook for 4-layer CSI reporting when 16 or more antenna ports are used.

TABLE 9 codebookMode = 1-2, $P_{CSI-RS} \geq 16$

| $i_{1,1}$ | $i_{1,2}$ | $i_{1,3}$ | $i_2$ | |
|---|---|---|---|---|
| $0,\ldots,\dfrac{N_1O_1}{2}-1$ | $0,\ldots,N_2O_2-1$ | $0,1,2,3$ | $0,1$ | $W_{i_{1,1},i_{1,2},i_{1,3},i_2}^{(4)}$ | where $W_{l,m,p,n}^{(4)} = \dfrac{1}{\sqrt{4P_{CSI-RS}}} \begin{bmatrix} \tilde{v}_{l,m} & \tilde{v}_{l,m} & \tilde{v}_{l,m} & \tilde{v}_{l,m} \\ \theta_p \tilde{v}_{l,m} & -\theta_p \tilde{v}_{l,m} & \theta_p \tilde{v}_{l,m} & -\theta_p \tilde{v}_{l,m} \\ \varphi_n \tilde{v}_{l,m} & \varphi_n \tilde{v}_{l,m} & -\varphi_n \tilde{v}_{l,m} & -\varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} & \varphi_n \theta_p \tilde{v}_{l,m} \end{bmatrix}$.

Variables used in Table 4 to Table 9 may be defined as shown in Equation 2 provided below.

$$\varphi_n = e^{j\pi n/2} \qquad \text{[Equation 2]}$$

$$u_m = \begin{cases} \begin{bmatrix} 1 & e^{j\frac{2\pi n}{O_2 N_2}} & \ldots & e^{j\frac{2\pi n(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

$$\tilde{v}_{l,m} = \begin{bmatrix} u_m & e^{j\frac{4\pi l}{O_1 N_1}} u_m & \ldots & e^{j\frac{4\pi l(N_1/2-1)}{O_1 N_1}} u_m \end{bmatrix}^T$$

In Equation 2, $N_1$ denotes the number of horizontal antenna ports, $N_2$ denotes the number of vertical antenna ports, $O_1$ denotes a horizontal oversampling factor, and $O_2$ denotes a vertical oversampling factor.

Codebooks expressed in Table 1 to Table 9 and Equation 2 are provided to help in understanding the concept of a codebook. The disclosure is, however, not limited to the codebooks set forth in Table 1 to Table 9 or to Equation 2.

As described above, precoding may be used in order to increase the performance of transmission and reception. A precoder may be calculated by applying a channel estimated value in real time or may be selected among a plurality of precoders defined in advance. According to the former, a digital signal processor (DSP) which has a high processing speed may be needed. According to the latter, a memory space for storing previously defined precoders may be needed. However, the DSP performance and the memory capacity need to be implemented within a limited cost. Therefore, if the required DSP processing speed or memory capacity increases due to an increase in a codebook size, it may be difficult to implement hardware.

As shown in Equation 1, the number of elements of a precoder may be determined as the product of the number of transmission antenna ports and the number of layers. Therefore, as the number of transmission or reception antennas and the number of layers increases, the size of a codebook increases exponentially. Also, referring to the examples of Table 1 to Table 9, if the number of antennas increases, various $P_{CSI-RS}$ and ($N_1$, $N_2$) combinations need to be supported. Accordingly, the size of a codebook may be increased.

If the scheme of storing precoders defined according to the examples of Table 1 to Table 9 in a memory is used, the number of precoders associated with the number of layers and the required memory capacity may be calculated as shown in Table 10 to Table 13. Table 10 shows the number of precoders and the required memory capacity in the case of 1-layer transmission. Table 11 shows the number of precoders and the required memory capacity in the case of 2-layer transmission. Table 12 shows the number of precoders and the required memory capacity in the case of 3-layer transmission. Table 13 shows the number of precoders and the required memory capacity in the case of 4-layer transmission.

TABLE 10

| $P_{CSI-RS}$ | ($N_1$, $N_2$) | ($O_1$, $O_2$) | $i_{1,1}$ | $i_{1,2}$ | $i_2$ | $i_{1,3}$ | Number of precoders | Memory capacity [bits] |
|---|---|---|---|---|---|---|---|---|
| 32 | 4,4 | 4,4 | 0~15 | 0~15 | 0,1,2,3 | — | 1024 | 1,048,576 |
|  | 8,2 | 4,4 | 0~31 | 0~7 | 0,1,2,3 | — | 1024 | 1,048,576 |
|  | 16,1 | 4,1 | 0~63 | 0 | 0,1,2,3 | — | 256 | 262,144 |
| 16 | 4,2 | 4,4 | 0~15 | 0~7 | 0,1,2,3 | — | 512 | 262,144 |
|  | 8,1 | 4,1 | 0~31 | 0 | 0,1,2,3 | — | 128 | 65,536 |
| 8 | 2,2 | 4,4 | 0~7 | 0~7 | 0,1,2,3 | — | 256 | 65,536 |
|  | 4,1 | 4,1 | 0~15 | 0 | 0,1,2,3 | — | 64 | 16,384 |
| 4 | 2,1 | 4,1 | 0~7 | 0 | 0,1,2,3 | — | 32 | 4,096 |

TABLE 11

| $P_{CSI-RS}$ | ($N_1$, $N_2$) | ($O_1$, $O_2$) | $i_{1,1}$ | $i_{1,2}$ | $i_2$ | $i_{1,3}$ | Number of precoders | Memory capacity [bits] |
|---|---|---|---|---|---|---|---|---|
| 32 | 4,4 | 4,4 | 0~15 | 0~15 | 0, 1 | 0,1,2,3 | 2048 | 4,194,304 |
|  | 8,2 | 4,4 | 0~31 | 0~7 | 0, 1 | 0,1,2,3 | 2048 | 4,194,304 |
|  | 16,1 | 4,1 | 0~63 | 0 | 0, 1 | 0,1,2,3 | 512 | 1,048,576 |
| 16 | 4,2 | 4,4 | 0~15 | 0~7 | 0, 1 | 0,1,2,3 | 1024 | 1048,576 |
|  | 8,1 | 4,1 | 0~31 | 0 | 0, 1 | 0,1,2,3 | 256 | 262,144 |
| 8 | 2,2 | 4,4 | 0~7 | 0~7 | 0, 1 | 0,1,2,3 | 512 | 262,144 |
|  | 4,1 | 4,1 | 0~15 | 0 | 0, 1 | 0,1,2,3 | 128 | 65,536 |
| 4 | 2,1 | 4,1 | 0~7 | 0 | 0, 1 | — | 16 | 4,096 |

TABLE 12

| $P_{CSI-RS}$ | ($N_1$, $N_2$) | ($O_1$, $O_2$) | $i_{1,1}$ | $i_{1,2}$ | $i_2$ | $i_{1,3}$ | Number of precoders | Memory capacity [bits] |
|---|---|---|---|---|---|---|---|---|
| 32 | 4,4 | 4,4 | 0~7 | 0~15 | 0, 1 | — | 512 | 1,572,864 |
|  | 8,2 | 4,4 | 0~15 | 0~7 | 0, 1 | — | 512 | 1,572,864 |
|  | 16,1 | 4,1 | 0~31 | 0 | 0, 1 | — | 128 | 393,216 |
| 16 | 4,2 | 4,4 | 0~7 | 0~7 | 0, 1 | — | 256 | 393,216 |
|  | 8,1 | 4,1 | 0~15 | 0 | 0, 1 | — | 64 | 98,304 |
| 8 | 2,2 | 4,4 | 0~7 | 0~7 | 0, 1 | 3 | 384 | 294,912 |
|  | 4,1 | 4,1 | 0~15 | 0 | 0, 1 | 3 | 96 | 73,728 |
| 4 | 2,1 | 4,1 | 0~7 | 0 | 0, 1 | 1 | 16 | 6,144 |

TABLE 13

| $P_{CSI-RS}$ | ($N_1$, $N_2$) | ($O_1$, $O_2$) | $i_{1,1}$ | $i_{1,2}$ | $i_2$ | $i_{1,3}$ | Number of precoders | Memory capacity [bits] |
|---|---|---|---|---|---|---|---|---|
| 32 | 4,4 | 4,4 | 0~7 | 0~15 | 0, 1 | — | 512 | 2,097,152 |
|  | 8,2 | 4,4 | 0~15 | 0~7 | 0, 1 | — | 512 | 2,097,152 |
|  | 16,1 | 4,1 | 0~31 | 0 | 0, 1 | — | 128 | 524,288 |
| 16 | 4,2 | 4,4 | 0~7 | 0~7 | 0, 1 | — | 256 | 524,288 |
|  | 8,1 | 4,1 | 0~15 | 0 | 0, 1 | — | 64 | 131,072 |
| 8 | 2,2 | 4,4 | 0~7 | 0~7 | 0, 1 | 3 | 384 | 393,216 |
|  | 4,1 | 4,1 | 0~15 | 0 | 0, 1 | 3 | 96 | 98,304 |
| 4 | 2,1 | 4,1 | 0~7 | 0 | 0, 1 | 1 | 16 | 8,192 |

Table 10 to Table 13 show the number of precoders and the required memory capacity when $P_{CSI-RS}$ is 32, 16, 8, and 4. If it is assumed that a total of 13,776 precoders are present, and that an in-phase precoder element and a quadrature precoder element each have a length of 16 bits, a memory capacity of a total of 24,131,584 bits may be required. This corresponds to the amount of data that 655 36 Kbits-size block read only memories (RAM) can store. The amount of data may occupy most of the embedded memory of a field-programmable gate array (FPGA) or may disrupt the performance of functions other than codebook storing.

Therefore, the disclosure will describe embodiments for reducing the amount of memory occupied by a codebook. Various embodiments relate to calculation of a precoder, and relate to technology that stores, in a memory, values corresponding to some processes for performing calculations in advance in association with generation of a precoder so as to reduce the amount of calculation time, a memory capacity, and hardware resources.

Figure 6:
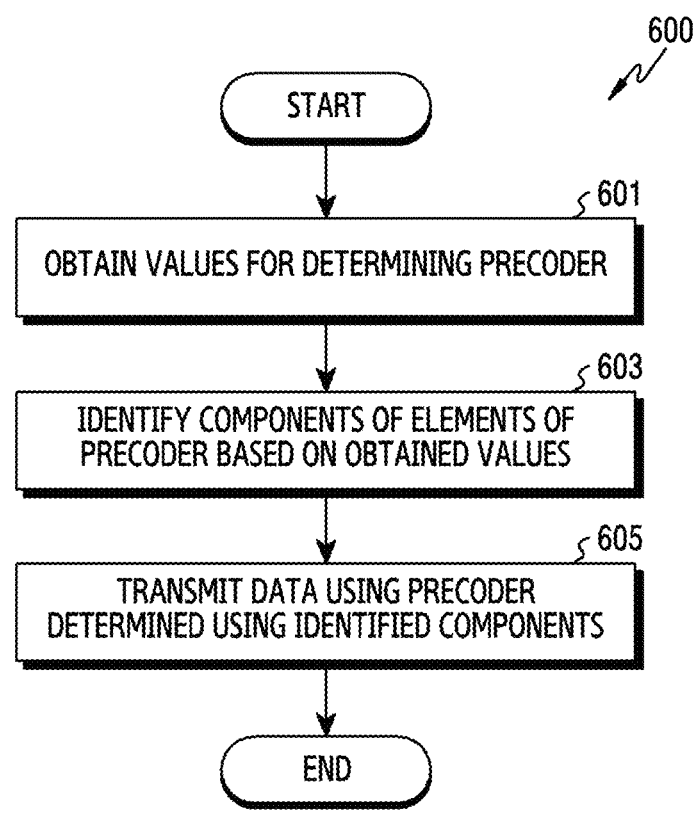
FIG. 6 is a flowchart illustrating the operation in which a base station performs precoding in a wireless communication system according to various embodiments.

FIG. 6 is a flowchart 600 illustrating an operation in which a base station performs precoding in a wireless communication system according to various embodiments. FIG. 6 illustrates the operation method of the base station 110.

Referring to FIG. 6, in operation 601, the base station obtains values for determining a precoder. The obtained values correspond to at least one value needed for defining a precoder. For example, the obtained values may include at least one of information associated with the number of layers, information associated with an antenna port, and variables related to at least one precoder. The information associated with an antenna port may include at least one of the number of antenna ports, the number of vertical-axis antenna ports, and the number of horizontal-axis antenna ports. According to an embodiment, the base station may determine values for determining a precoder based on channel information. According to another embodiment, the base station may determine values for determining a precoder, based on information indicating a precoder reported from a terminal and channel information.

Figure 7:
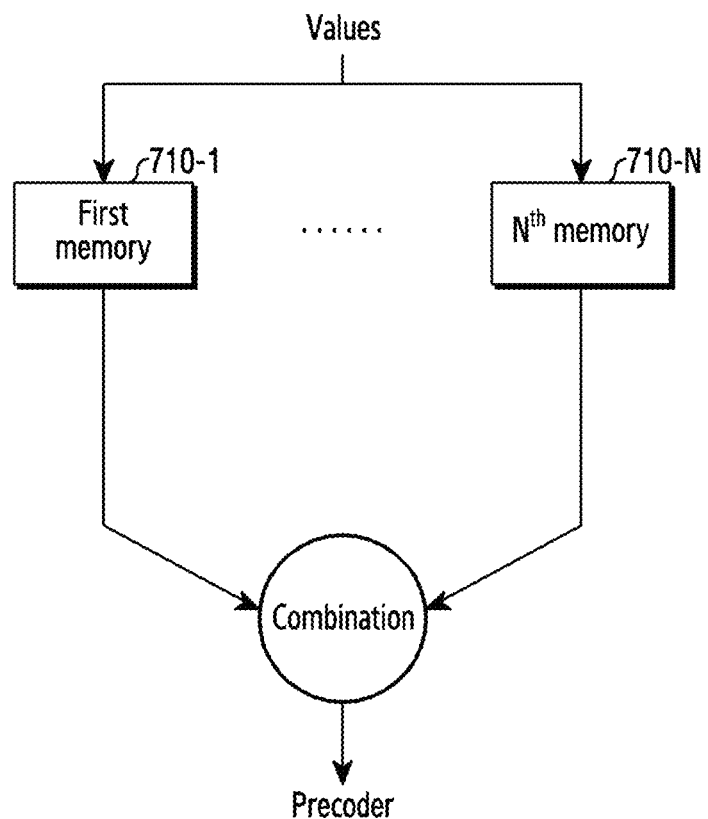
FIG. 7 is a diagram illustrating a functional configuration for determining a precoder in a wireless communication system according to various embodiments.

In operation 603, the base station may identify the components of the elements of a precoder based on the obtained values. Each element included in the precoder may be divided into a plurality of components. For example, the plurality of components may include at least one of a phase value, an exponent value, or a sign. According to various embodiments, the base station may search memories storing information that defines correspondences between the obtained values and components so as to identify the plurality of component values. Here, at least one of the plurality of components may be determined by taking another component as an input variable. For example, as illustrated in FIG. 7, the base station may identify values corresponding to the obtained values from a plurality of memories 710-1 to 710-N which respectively correspond to a plurality of components (e.g., N components) included in a precoder. Here, the memories 710-1 to 710-N may be storage spaces that store different mapping tables.

In operation 605, the base station transmits data using a precoder including the identified components. The base station may determine a precoder using the identified components. That is, as illustrated in FIG. 7, the base station may combine the component values identified using the plurality of memories 710-1 to 710-N so as to determine a precoder corresponding to the identified values. Accordingly, the base station maps transmission data to at least one layer, performs precoding using the determined precoder, and performs transmission via a plurality of antennas.

As described with reference to FIG. 6, by adapting a scheme in which each element of a precoder is divided into a plurality of components and in which values included in a precoder are determined for each component, the memory capacity required to store a precoder may be dramatically reduced compared to the case in which the entire precoder is stored. In this instance, the operation of searching a memory for each component may be repeated as many times as the number of elements included in the precoder. In order to reduce the amount of search time, a scheme in which a plurality of pieces of hardware for searching for each component is implemented and a plurality of elements is determined may be used. Here, the number of pieces of hardware may be determined based on the operation speeds of the corresponding pieces of hardware. If an operation speed is sufficiently fast, a scheme of repeatedly performing searching using a single piece of hardware may be used.

Hereinafter, a detailed embodiment will be described using a DFT codebook used in long-term evolution (LTE), LTE-advanced (LTE-A), and 5G NR. However, the embodiments described below may be applicable to a codebook provided in a different form. Particularly, for ease of description, a codebook defined in 3GPP TS 38.214, which is the standard of 5G NR, is illustrated, but the embodiments described below may be applicable to other codebooks. That is, although embodiments associated with the case in which codebook mode 1 of 3GPP TS 38.214 is used, the number of layers is 1 to 4, and the number of antenna ports is 4, 8, 16, and 32, are described, the embodiments provided below may be applicable to other codebooks.

In order to obtain the components of an element included in a precoder, the structure of elements of a precoder defined as shown in Table 4 to Table 9 may be taken into consideration. The structure of elements of a precoder is as shown in Equation 3 to Equation 9 provided below. Equation 3 is a precoder included in a codebook corresponding to 4-layer transmission, $P_{CSI-RS}=32$, $N_1=4$, and $N_2=4$.

[Equation 3]

$$W_{l,m,p,n} = \frac{1}{\sqrt{4P_{CSI-RS}}} \begin{bmatrix} \tilde{v}_{l,m} & \tilde{v}_{l,m} & \tilde{v}_{l,m} & \tilde{v}_{l,m} \\ e^{j\frac{\pi}{4}p}\tilde{v}_{l,m} & -e^{j\frac{\pi}{4}p}\tilde{v}_{l,m} & e^{j\frac{\pi}{4}p}\tilde{v}_{l,m} & -e^{j\frac{\pi}{4}p}\tilde{v}_{l,m} \\ e^{j\frac{\pi}{2}n}\tilde{v}_{l,m} & e^{j\frac{\pi}{2}n}\tilde{v}_{l,m} & -e^{j\frac{\pi}{2}n}\tilde{v}_{l,m} & -e^{j\frac{\pi}{2}n}\tilde{v}_{l,m} \\ e^{j\frac{\pi}{2}n}e^{j\frac{\pi}{4}p}\tilde{v}_{l,m} & -e^{j\frac{\pi}{2}n}e^{j\frac{\pi}{4}p}\tilde{v}_{l,m} & -e^{j\frac{\pi}{2}n}e^{j\frac{\pi}{4}p}\tilde{v}_{l,m} & e^{j\frac{\pi}{2}n}e^{j\frac{\pi}{4}p}\tilde{v}_{l,m} \end{bmatrix}$$

$$= \frac{1}{\sqrt{4P_{CSI-RS}}} \begin{bmatrix} e^{j\frac{2\pi(0l+0m+0p+0n)}{16}} & e^{j\frac{2\pi(0l+0m+2p+0n)}{16}} & e^{j\frac{2\pi(0l+0m+0p+0n)}{16}} & e^{j\frac{2\pi(0l+0m+2p+0n)}{16}} & \cdots & e^{j\frac{2\pi(0l+0m+0p+4n)}{16}} & e^{j\frac{2\pi(0l+0m+2p+4n)}{16}} & e^{j\frac{2\pi(0l+0m+0p+4n)}{16}} & e^{j\frac{2\pi(0l+0m+2p+4n)}{16}} \\ e^{j\frac{2\pi(0l+1m+0p+0n)}{16}} & e^{j\frac{2\pi(0l+1m+2p+0n)}{16}} & e^{j\frac{2\pi(0l+1m+0p+0n)}{16}} & e^{j\frac{2\pi(0l+1m+2p+0n)}{16}} & \cdots & e^{j\frac{2\pi(0l+1m+0p+4n)}{16}} & e^{j\frac{2\pi(0l+1m+2p+4n)}{16}} & e^{j\frac{2\pi(0l+1m+0p+4n)}{16}} & e^{j\frac{2\pi(0l+1m+2p+4n)}{16}} \\ e^{j\frac{2\pi(0l+2m+0p+0n)}{16}} & e^{j\frac{2\pi(0l+2m+2p+0n)}{16}} & e^{j\frac{2\pi(0l+2m+0p+0n)}{16}} & e^{j\frac{2\pi(0l+2m+2p+0n)}{16}} & \cdots & e^{j\frac{2\pi(0l+2m+0p+4n)}{16}} & e^{j\frac{2\pi(0l+2m+2p+4n)}{16}} & e^{j\frac{2\pi(0l+2m+0p+4n)}{16}} & e^{j\frac{2\pi(0l+2m+2p+4n)}{16}} \\ e^{j\frac{2\pi(0l+3m+0p+0n)}{16}} & e^{j\frac{2\pi(0l+3m+2p+0n)}{16}} & e^{j\frac{2\pi(0l+3m+0p+0n)}{16}} & e^{j\frac{2\pi(0l+3m+2p+0n)}{16}} & \cdots & e^{j\frac{2\pi(0l+3m+0p+4n)}{16}} & e^{j\frac{2\pi(0l+3m+2p+4n)}{16}} & e^{j\frac{2\pi(0l+3m+0p+4n)}{16}} & e^{j\frac{2\pi(0l+3m+2p+4n)}{16}} \\ e^{j\frac{2\pi(2l+0m+0p+0n)}{16}} & e^{j\frac{2\pi(2l+0m+2p+0n)}{16}} & e^{j\frac{2\pi(2l+0m+0p+0n)}{16}} & e^{j\frac{2\pi(2l+0m+2p+0n)}{16}} & \cdots & e^{j\frac{2\pi(2l+0m+0p+4n)}{16}} & e^{j\frac{2\pi(2l+0m+2p+4n)}{16}} & e^{j\frac{2\pi(2l+0m+0p+4n)}{16}} & e^{j\frac{2\pi(2l+0m+2p+4n)}{16}} \\ e^{j\frac{2\pi(2l+m+0p+0n)}{16}} & e^{j\frac{2\pi(2l+m+2p+0n)}{16}} & e^{j\frac{2\pi(2l+m+0p+0n)}{16}} & e^{j\frac{2\pi(2l+m+2p+0n)}{16}} & \cdots & e^{j\frac{2\pi(2l+m+0p+4n)}{16}} & e^{j\frac{2\pi(2l+m+2p+4n)}{16}} & e^{j\frac{2\pi(2l+m+0p+4n)}{16}} & e^{j\frac{2\pi(2l+m+2p+4n)}{16}} \\ e^{j\frac{2\pi(2l+2m+0p+0n)}{16}} & e^{j\frac{2\pi(2l+2m+2p+0n)}{16}} & e^{j\frac{2\pi(2l+2m+0p+0n)}{16}} & e^{j\frac{2\pi(2l+2m+2p+0n)}{16}} & \cdots & e^{j\frac{2\pi(2l+2m+0p+4n)}{16}} & e^{j\frac{2\pi(2l+2m+2p+4n)}{16}} & e^{j\frac{2\pi(2l+2m+0p+4n)}{16}} & e^{j\frac{2\pi(2l+2m+2p+4n)}{16}} \\ e^{j\frac{2\pi(2l+3m+0p+0n)}{16}} & e^{j\frac{2\pi(2l+3m+2p+0n)}{16}} & e^{j\frac{2\pi(2l+3m+0p+0n)}{16}} & e^{j\frac{2\pi(2l+3m+2p+0n)}{16}} & \cdots & e^{j\frac{2\pi(2l+3m+0p+4n)}{16}} & e^{j\frac{2\pi(2l+3m+2p+4n)}{16}} & e^{j\frac{2\pi(2l+3m+0p+4n)}{16}} & e^{j\frac{2\pi(2l+3m+2p+4n)}{16}} \end{bmatrix}$$

In Equation 3, $w_{l,m,p,n}$ denotes a precoder defined by variables l, m, p, and n, and $P_{CSI-RS}$ denotes the number of antenna ports.

Equation 4 is a precoder included in a codebook corresponding to 4-layer transmission, $P_{CSI-RS}=32$, $N_1=8$, and $N_2=4$.

In Equation 4, $w_{l,m,p,n}$ denotes a precoder defined by variables l, m, p, and n, and $P_{CSI-RS}$ denotes the number of antenna ports.

Equation 5 is a precoder included in a codebook corresponding to 4-layer transmission, $P_{CSI-RS}=16$, $N_1=4$, and $N_2=2$.

$$w_{l,m,p,n} = \frac{1}{\sqrt{4P_{CSI-RS}}} \begin{bmatrix} e^{j\frac{2\pi(0l+0m)}{32}} & e^{j\frac{2\pi(0l+0m)}{32}} & e^{j\frac{2\pi(0l+0m)}{32}} & e^{j\frac{2\pi(0l+0m)}{32}} \\ e^{j\frac{2\pi(0l+4m)}{32}} & e^{j\frac{2\pi(0l+4m)}{32}} & e^{j\frac{2\pi(0l+4m)}{32}} & e^{j\frac{2\pi(0l+4m)}{32}} \\ e^{j\frac{2\pi(2l+0m)}{32}} & e^{j\frac{2\pi(2l+0m)}{32}} & e^{j\frac{2\pi(2l+0m)}{32}} & e^{j\frac{2\pi(2l+0m)}{32}} \\ e^{j\frac{2\pi(2l+4m)}{32}} & e^{j\frac{2\pi(2l+4m)}{32}} & e^{j\frac{2\pi(2l+4m)}{32}} & e^{j\frac{2\pi(2l+4m)}{32}} \\ e^{j\frac{2\pi(4l+0m)}{32}} & e^{j\frac{2\pi(4l+0m)}{32}} & e^{j\frac{2\pi(4l+0m)}{32}} & e^{j\frac{2\pi(4l+0m)}{32}} \\ e^{j\frac{2\pi(4l+4m)}{32}} & e^{j\frac{2\pi(4l+4m)}{32}} & e^{j\frac{2\pi(4l+4m)}{32}} & e^{j\frac{2\pi(4l+4m)}{32}} \\ e^{j\frac{2\pi(6l+0m)}{32}} & e^{j\frac{2\pi(6l+0m)}{32}} & e^{j\frac{2\pi(6l+0m)}{32}} & e^{j\frac{2\pi(6l+0m)}{32}} \\ e^{j\frac{2\pi(6l+4m)}{32}} & e^{j\frac{2\pi(6l+4m)}{32}} & e^{j\frac{2\pi(6l+4m)}{32}} & e^{j\frac{2\pi(6l+4m)}{32}} \\ e^{j\frac{2\pi(0l+0m+4p)}{32}} & -e^{j\frac{2\pi(0l+0m+4p)}{32}} & e^{j\frac{2\pi(0l+0m+4p)}{32}} & -e^{j\frac{2\pi(0l+0m+4p)}{32}} \\ e^{j\frac{2\pi(0l+4m+4p)}{32}} & -e^{j\frac{2\pi(0l+4m+4p)}{32}} & e^{j\frac{2\pi(0l+4m+4p)}{32}} & -e^{j\frac{2\pi(0l+4m+4p)}{32}} \\ e^{j\frac{2\pi(2l+0m+4p)}{32}} & -e^{j\frac{2\pi(2l+0m+4p)}{32}} & e^{j\frac{2\pi(2l+0m+4p)}{32}} & -e^{j\frac{2\pi(2l+0m+4p)}{32}} \\ e^{j\frac{2\pi(2l+4m+4p)}{32}} & -e^{j\frac{2\pi(2l+4m+4p)}{32}} & e^{j\frac{2\pi(2l+4m+4p)}{32}} & -e^{j\frac{2\pi(2l+4m+4p)}{32}} \\ e^{j\frac{2\pi(4l+0m+4p)}{32}} & -e^{j\frac{2\pi(4l+0m+4p)}{32}} & e^{j\frac{2\pi(4l+0m+4p)}{32}} & -e^{j\frac{2\pi(4l+0m+4p)}{32}} \\ e^{j\frac{2\pi(4l+4m+4p)}{32}} & -e^{j\frac{2\pi(4l+4m+4p)}{32}} & e^{j\frac{2\pi(4l+4m+4p)}{32}} & -e^{j\frac{2\pi(4l+4m+4p)}{32}} \\ e^{j\frac{2\pi(6l+0m+4p)}{32}} & -e^{j\frac{2\pi(6l+0m+4p)}{32}} & e^{j\frac{2\pi(6l+0m+4p)}{32}} & -e^{j\frac{2\pi(6l+0m+4p)}{32}} \\ e^{j\frac{2\pi(6l+4m+4p)}{32}} & -e^{j\frac{2\pi(6l+4m+4p)}{32}} & e^{j\frac{2\pi(6l+4m+4p)}{32}} & -e^{j\frac{2\pi(6l+4m+4p)}{32}} \end{bmatrix}$$

[Equation 4]

$$\cdots \begin{bmatrix} e^{j\frac{2\pi(0l+0m+8n)}{32}} & e^{j\frac{2\pi(0l+0m+8n)}{32}} & -e^{j\frac{2\pi(0l+0m+8n)}{32}} & -e^{j\frac{2\pi(0l+0m+8n)}{32}} \\ e^{j\frac{2\pi(0l+4m+8n)}{32}} & e^{j\frac{2\pi(0l+4m+8n)}{32}} & -e^{j\frac{2\pi(0l+4m+8n)}{32}} & -e^{j\frac{2\pi(0l+4m+8n)}{32}} \\ e^{j\frac{2\pi(2l+0m+8n)}{32}} & e^{j\frac{2\pi(2l+0m+8n)}{32}} & -e^{j\frac{2\pi(2l+0m+8n)}{32}} & -e^{j\frac{2\pi(2l+0m+8n)}{32}} \\ e^{j\frac{2\pi(2l+4m+8n)}{32}} & e^{j\frac{2\pi(2l+4m+8n)}{32}} & -e^{j\frac{2\pi(2l+4m+8n)}{32}} & -e^{j\frac{2\pi(2l+4m+8n)}{32}} \\ e^{j\frac{2\pi(4l+0m+8n)}{32}} & e^{j\frac{2\pi(4l+0m+8n)}{32}} & -e^{j\frac{2\pi(4l+0m+8n)}{32}} & -e^{j\frac{2\pi(4l+0m+8n)}{32}} \\ e^{j\frac{2\pi(4l+4m+8n)}{32}} & e^{j\frac{2\pi(4l+4m+8n)}{32}} & -e^{j\frac{2\pi(4l+4m+8n)}{32}} & -e^{j\frac{2\pi(4l+4m+8n)}{32}} \\ e^{j\frac{2\pi(6l+0m+8n)}{32}} & e^{j\frac{2\pi(6l+0m+8n)}{32}} & -e^{j\frac{2\pi(6l+0m+8n)}{32}} & -e^{j\frac{2\pi(6l+0m+8n)}{32}} \\ e^{j\frac{2\pi(6l+4m+8n)}{32}} & e^{j\frac{2\pi(6l+4m+8n)}{32}} & -e^{j\frac{2\pi(6l+4m+8n)}{32}} & -e^{j\frac{2\pi(6l+4m+8n)}{32}} \\ e^{j\frac{2\pi(0l+0m+4p+8n)}{32}} & -e^{j\frac{2\pi(0l+0m+4p+8n)}{32}} & -e^{j\frac{2\pi(0l+0m+4p+8n)}{32}} & e^{j\frac{2\pi(0l+0m+4p+8n)}{32}} \\ e^{j\frac{2\pi(0l+4m+4p+8n)}{32}} & -e^{j\frac{2\pi(0l+4m+4p+8n)}{32}} & -e^{j\frac{2\pi(0l+4m+4p+8n)}{32}} & e^{j\frac{2\pi(0l+4m+4p+8n)}{32}} \\ e^{j\frac{2\pi(2l+0m+4p+8n)}{32}} & -e^{j\frac{2\pi(2l+0m+4p+8n)}{32}} & -e^{j\frac{2\pi(2l+0m+4p+8n)}{32}} & e^{j\frac{2\pi(2l+0m+4p+8n)}{32}} \\ e^{j\frac{2\pi(2l+4m+4p+8n)}{32}} & -e^{j\frac{2\pi(2l+4m+4p+8n)}{32}} & -e^{j\frac{2\pi(2l+4m+4p+8n)}{32}} & e^{j\frac{2\pi(2l+4m+4p+8n)}{32}} \\ e^{j\frac{2\pi(4l+0m+4p+8n)}{32}} & -e^{j\frac{2\pi(4l+0m+4p+8n)}{32}} & -e^{j\frac{2\pi(4l+0m+4p+8n)}{32}} & e^{j\frac{2\pi(4l+0m+4p+8n)}{32}} \\ e^{j\frac{2\pi(4l+4m+4p+8n)}{32}} & -e^{j\frac{2\pi(4l+4m+4p+8n)}{32}} & -e^{j\frac{2\pi(4l+4m+4p+8n)}{32}} & e^{j\frac{2\pi(4l+4m+4p+8n)}{32}} \\ e^{j\frac{2\pi(6l+0m+4p+8n)}{32}} & -e^{j\frac{2\pi(6l+0m+4p+8n)}{32}} & -e^{j\frac{2\pi(6l+0m+4p+8n)}{32}} & e^{j\frac{2\pi(6l+0m+4p+8n)}{32}} \\ e^{j\frac{2\pi(6l+4m+4p+8n)}{32}} & -e^{j\frac{2\pi(6l+4m+4p+8n)}{32}} & -e^{j\frac{2\pi(6l+4m+4p+8n)}{32}} & e^{j\frac{2\pi(6l+4m+4p+8n)}{32}} \end{bmatrix}$$

Equation 9 is a precoder included in a codebook corresponding to 4-layer transmission, $P_{CSI-RS}=4$, $N_1=2$, and $N_2=1$.

$$W_{l,m,p,n} = \frac{1}{\sqrt{4P_{CSI-RS}}} \begin{bmatrix} e^{j\frac{2\pi(0l+0m+0p+0n)}{8}} & e^{j\frac{2\pi(0l+0m+0p+0n)}{8}} & e^{j\frac{2\pi(0l+0m+0p+0n)}{8}} & e^{j\frac{2\pi(0l+0m+0p+0n)}{8}} \\ e^{j\frac{2\pi(0l+1m+0p+0n)}{8}} & e^{j\frac{2\pi(0l+1m+0p+0n)}{8}} & e^{j\frac{2\pi(0l+1m+0p+0n)}{8}} & e^{j\frac{2\pi(0l+1m+0p+0n)}{8}} \\ e^{j\frac{2\pi(1l+0m+0p+0n)}{8}} & e^{j\frac{2\pi(1l+0m+0p+0n)}{8}} & e^{j\frac{2\pi(1l+0m+0p+0n)}{8}} & e^{j\frac{2\pi(1l+0m+0p+0n)}{8}} \\ e^{j\frac{2\pi(1l+1m+0p+0n)}{8}} & e^{j\frac{2\pi(1l+1m+0p+0n)}{8}} & e^{j\frac{2\pi(1l+1m+0p+0n)}{8}} & e^{j\frac{2\pi(1l+1m+0p+0n)}{8}} \\ e^{j\frac{2\pi(0l+0m+1p+0n)}{8}} & -e^{j\frac{2\pi(0l+0m+1p+0n)}{8}} & e^{j\frac{2\pi(0l+0m+1p+0n)}{8}} & -e^{j\frac{2\pi(0l+0m+1p+0n)}{8}} \\ e^{j\frac{2\pi(0l+1m+1p+0n)}{8}} & -e^{j\frac{2\pi(0l+1m+1p+0n)}{8}} & e^{j\frac{2\pi(0l+1m+1p+0n)}{8}} & -e^{j\frac{2\pi(0l+1m+1p+0n)}{8}} \\ e^{j\frac{2\pi(1l+0m+1p+0n)}{8}} & -e^{j\frac{2\pi(1l+0m+1p+0n)}{8}} & e^{j\frac{2\pi(1l+0m+1p+0n)}{8}} & -e^{j\frac{2\pi(1l+0m+1p+0n)}{8}} \\ e^{j\frac{2\pi(1l+1m+1p+0n)}{8}} & -e^{j\frac{2\pi(1l+1m+1p+0n)}{8}} & e^{j\frac{2\pi(1l+1m+1p+0n)}{8}} & -e^{j\frac{2\pi(1l+1m+1p+0n)}{8}} \end{bmatrix} \quad \text{[Equation 5]}$$

$$\cdots \begin{bmatrix} e^{j\frac{2\pi(0l+0m+0p+2n)}{8}} & e^{j\frac{2\pi(0l+0m+0p+2n)}{8}} & -e^{j\frac{2\pi(0l+0m+0p+2n)}{8}} & -e^{j\frac{2\pi(0l+0m+0p+2n)}{8}} \\ e^{j\frac{2\pi(0l+1m+0p+2n)}{8}} & e^{j\frac{2\pi(0l+1m+0p+2n)}{8}} & -e^{j\frac{2\pi(0l+1m+0p+2n)}{8}} & -e^{j\frac{2\pi(0l+1m+0p+2n)}{8}} \\ e^{j\frac{2\pi(1l+0m+0p+2n)}{8}} & e^{j\frac{2\pi(1l+0m+0p+2n)}{8}} & -e^{j\frac{2\pi(1l+0m+0p+2n)}{8}} & -e^{j\frac{2\pi(1l+0m+0p+2n)}{8}} \\ e^{j\frac{2\pi(1l+1m+0p+2n)}{8}} & e^{j\frac{2\pi(1l+1m+0p+2n)}{8}} & -e^{j\frac{2\pi(1l+1m+0p+2n)}{8}} & -e^{j\frac{2\pi(1l+1m+0p+2n)}{8}} \\ e^{j\frac{2\pi(0l+0m+1p+2n)}{8}} & -e^{j\frac{2\pi(0l+0m+1p+2n)}{8}} & -e^{j\frac{2\pi(0l+0m+1p+2n)}{8}} & e^{j\frac{2\pi(0l+0m+1p+2n)}{8}} \\ e^{j\frac{2\pi(0l+1m+1p+2n)}{8}} & -e^{j\frac{2\pi(0l+1m+1p+2n)}{8}} & -e^{j\frac{2\pi(0l+1m+1p+2n)}{8}} & e^{j\frac{2\pi(0l+1m+1p+2n)}{8}} \\ e^{j\frac{2\pi(1l+0m+1p+2n)}{8}} & -e^{j\frac{2\pi(1l+0m+1p+2n)}{8}} & -e^{j\frac{2\pi(1l+0m+1p+2n)}{8}} & e^{j\frac{2\pi(1l+0m+1p+2n)}{8}} \\ e^{j\frac{2\pi(1l+1m+1p+2n)}{8}} & -e^{j\frac{2\pi(1l+1m+1p+2n)}{8}} & -e^{j\frac{2\pi(1l+1m+1p+2n)}{8}} & e^{j\frac{2\pi(1l+1m+1p+2n)}{8}} \end{bmatrix}$$

In Equation 5, $w_{l,m,p,n}$ denotes a precoder defined by variables l, m, p, and n, and $P_{CSI-RS}$ denotes the number of antenna ports.

Equation 6 is a precoder included in a codebook corresponding to 4-layer transmission, $P_{CSI-RS}=16$, $N_1=8$, and $N_2=1$.

$$W_{l,m,p,n} = \frac{1}{\sqrt{4P_{CSI-RS}}} \begin{bmatrix} e^{j\frac{2\pi(0l+0m+0p+0n)}{16}} & e^{j\frac{2\pi(0l+0m+0p+0n)}{16}} & e^{j\frac{2\pi(0l+0m+0p+0n)}{16}} & e^{j\frac{2\pi(0l+0m+0p+0n)}{16}} \\ e^{j\frac{2\pi(1l+0m+0p+0n)}{16}} & e^{j\frac{2\pi(1l+0m+0p+0n)}{16}} & e^{j\frac{2\pi(1l+0m+0p+0n)}{16}} & e^{j\frac{2\pi(1l+0m+0p+0n)}{16}} \\ e^{j\frac{2\pi(2l+0m+0p+0n)}{16}} & e^{j\frac{2\pi(2l+0m+0p+0n)}{16}} & e^{j\frac{2\pi(2l+0m+0p+0n)}{16}} & e^{j\frac{2\pi(2l+0m+0p+0n)}{16}} \\ e^{j\frac{2\pi(3l+0m+0p+0n)}{16}} & e^{j\frac{2\pi(3l+0m+0p+0n)}{16}} & e^{j\frac{2\pi(3l+0m+0p+0n)}{16}} & e^{j\frac{2\pi(3l+0m+0p+0n)}{16}} \\ e^{j\frac{2\pi(0l+0m+2p+0n)}{16}} & -e^{j\frac{2\pi(0l+0m+2p+0n)}{16}} & e^{j\frac{2\pi(0l+0m+2p+0n)}{16}} & -e^{j\frac{2\pi(0l+0m+2p+0n)}{16}} \\ e^{j\frac{2\pi(1l+0m+2p+0n)}{16}} & -e^{j\frac{2\pi(1l+0m+2p+0n)}{16}} & e^{j\frac{2\pi(1l+0m+2p+0n)}{16}} & -e^{j\frac{2\pi(1l+0m+2p+0n)}{16}} \\ e^{j\frac{2\pi(2l+0m+2p+0n)}{16}} & -e^{j\frac{2\pi(2l+0m+2p+0n)}{16}} & e^{j\frac{2\pi(2l+0m+2p+0n)}{16}} & -e^{j\frac{2\pi(2l+0m+2p+0n)}{16}} \\ e^{j\frac{2\pi(3l+0m+2p+0n)}{16}} & -e^{j\frac{2\pi(3l+0m+2p+0n)}{16}} & e^{j\frac{2\pi(3l+0m+2p+0n)}{16}} & -e^{j\frac{2\pi(3l+0m+2p+0n)}{16}} \end{bmatrix} \quad \text{[Equation 6]}$$

-continued $$\cdots \begin{bmatrix} e^{j\frac{2\pi(0l+0m+0p+4n)}{16}} & e^{j\frac{2\pi(0l+0m+0p+4n)}{16}} & -e^{j\frac{2\pi(0l+0m+0p+4n)}{16}} & -e^{j\frac{2\pi(0l+0m+0p+4n)}{16}} \\ e^{j\frac{2\pi(1l+0m+0p+4n)}{16}} & e^{j\frac{2\pi(1l+0m+0p+4n)}{16}} & -e^{j\frac{2\pi(1l+0m+0p+4n)}{16}} & -e^{j\frac{2\pi(1l+0m+0p+4n)}{16}} \\ e^{j\frac{2\pi(2l+0m+0p+4n)}{16}} & e^{j\frac{2\pi(2l+0m+0p+4n)}{16}} & -e^{j\frac{2\pi(2l+0m+0p+4n)}{16}} & -e^{j\frac{2\pi(2l+0m+0p+4n)}{16}} \\ e^{j\frac{2\pi(3l+0m+0p+4n)}{16}} & e^{j\frac{2\pi(3l+0m+0p+4n)}{16}} & -e^{j\frac{2\pi(3l+0m+0p+4n)}{16}} & -e^{j\frac{2\pi(3l+0m+0p+4n)}{16}} \\ e^{j\frac{2\pi(0l+0m+2p+4n)}{16}} & -e^{j\frac{2\pi(0l+0m+2p+4n)}{16}} & -e^{j\frac{2\pi(0l+0m+2p+4n)}{16}} & e^{j\frac{2\pi(0l+0m+2p+4n)}{16}} \\ e^{j\frac{2\pi(1l+0m+2p+4n)}{16}} & -e^{j\frac{2\pi(1l+0m+2p+4n)}{16}} & -e^{j\frac{2\pi(1l+0m+2p+4n)}{16}} & e^{j\frac{2\pi(1l+0m+2p+4n)}{16}} \\ e^{j\frac{2\pi(2l+0m+2p+4n)}{16}} & -e^{j\frac{2\pi(2l+0m+2p+4n)}{16}} & -e^{j\frac{2\pi(2l+0m+2p+4n)}{16}} & e^{j\frac{2\pi(2l+0m+2p+4n)}{16}} \\ e^{j\frac{2\pi(3l+0m+2p+4n)}{16}} & -e^{j\frac{2\pi(3l+0m+2p+4n)}{16}} & -e^{j\frac{2\pi(3l+0m+2p+4n)}{16}} & e^{j\frac{2\pi(3l+0m+2p+4n)}{16}} \end{bmatrix}$$

In Equation 6, $w_{l,m,p,n}$ denotes a precoder defined by variables l, m, p, and n, and $P_{CSI-RS}$ denotes the number of antenna ports.

Equation 7 is a precoder included in a codebook corresponding to 4-layer transmission, $P_{CSI-RS}=8$, $N_1=4$, and $N_2=1$.

$$W_{l,l',m,m',n} = \frac{1}{\sqrt{4P_{CSI-RS}}} \begin{bmatrix} v_{l,m} & v_{l',m'} & v_{l,m} & v_{l',m'} \\ \varphi_n v_{l,m} & \varphi_n v_{l',m'} & \varphi_n v_{l,m} & \varphi_n v_{l',m'} \end{bmatrix} \quad [\text{Equation 7}]$$

$$= \frac{1}{\sqrt{4 \cdot 8}} \begin{Bmatrix} e^{j\frac{2\pi(0l+0m)}{16}} & e^{j\frac{2\pi(0l'+0m')}{16}} & e^{j\frac{2\pi(0l+0m)}{16}} & e^{j\frac{2\pi(0l'+0m')}{16}} \\ e^{j\frac{2\pi(1l+0m)}{16}} & e^{j\frac{2\pi(1l'+0m')}{16}} & e^{j\frac{2\pi(1l+0m)}{16}} & e^{j\frac{2\pi(1l'+0m')}{16}} \\ e^{j\frac{2\pi(2l+0m)}{16}} & e^{j\frac{2\pi(2l'+0m')}{16}} & e^{j\frac{2\pi(2l+0m)}{16}} & e^{j\frac{2\pi(2l'+0m')}{16}} \\ e^{j\frac{2\pi(3l+0m)}{16}} & e^{j\frac{2\pi(3l'+0m')}{16}} & e^{j\frac{2\pi(3l+0m)}{16}} & e^{j\frac{2\pi(3l'+0m')}{16}} \\ e^{j\frac{2\pi(0l+0m+4n)}{16}} & e^{j\frac{2\pi(0l'+0m'+4n)}{16}} & e^{j\frac{2\pi(0l+0m+4n)}{16}} & e^{j\frac{2\pi(0l'+0m'+4n)}{16}} \\ e^{j\frac{2\pi(1l+0m+4n)}{16}} & e^{j\frac{2\pi(1l'+0m'+4n)}{16}} & e^{j\frac{2\pi(1l+0m+4n)}{16}} & e^{j\frac{2\pi(1l'+0m'+4n)}{16}} \\ e^{j\frac{2\pi(2l+0m+4n)}{16}} & e^{j\frac{2\pi(2l'+0m'+4n)}{16}} & e^{j\frac{2\pi(2l+0m+4n)}{16}} & e^{j\frac{2\pi(2l'+0m'+4n)}{16}} \\ e^{j\frac{2\pi(3l+0m+4n)}{16}} & e^{j\frac{2\pi(3l'+0m'+4n)}{16}} & e^{j\frac{2\pi(3l+0m+4n)}{16}} & e^{j\frac{2\pi(3l'+0m'+4n)}{16}} \end{Bmatrix}$$

In Equation 7, $w_{l,m,p,n}$ denotes a precoder defined by variables l, m, m', and n, and $P_{CSI-RS}$ denotes the number of antenna ports.

Equation 8 is a precoder included in a codebook corresponding to 4-layer transmission, $P_{CSI-RS}=8$, $N_1=2$, and $N_2=2$.

$$W_{l,l',m,m',n} = \frac{1}{\sqrt{4P_{CSI-RS}}} \begin{bmatrix} v_{l,m} & v_{l',m'} & v_{l,m} & v_{l',m'} \\ \varphi_n v_{l,m} & \varphi_n v_{l',m'} & \varphi_n v_{l,m} & \varphi_n v_{l',m'} \end{bmatrix} \quad [\text{Equation 8}]$$

$$= \frac{1}{\sqrt{4 \cdot 8}} \begin{Bmatrix} e^{j\frac{2\pi(0l+0m)}{8}} & e^{j\frac{2\pi(0l'+0m')}{8}} & e^{j\frac{2\pi(0l+0m)}{8}} & e^{j\frac{2\pi(0l'+0m')}{8}} \\ e^{j\frac{2\pi(0l+1m)}{8}} & e^{j\frac{2\pi(0l'+1m')}{8}} & e^{j\frac{2\pi(0l+1m)}{8}} & e^{j\frac{2\pi(0l'+1m')}{8}} \\ e^{j\frac{2\pi(1l+0m)}{8}} & e^{j\frac{2\pi(1l'+0m')}{8}} & e^{j\frac{2\pi(1l+0m)}{8}} & e^{j\frac{2\pi(1l'+0m')}{8}} \\ e^{j\frac{2\pi(1l+1m)}{8}} & e^{j\frac{2\pi(1l'+1m')}{8}} & e^{j\frac{2\pi(1l+1m)}{8}} & e^{j\frac{2\pi(1l'+1m')}{8}} \\ e^{j\frac{2\pi(0l+0m+2n)}{8}} & e^{j\frac{2\pi(0l'+0m'+2n)}{8}} & e^{j\frac{2\pi(0l+0m+2n)}{8}} & e^{j\frac{2\pi(0l'+0m'+2n)}{8}} \\ e^{j\frac{2\pi(0l+1m+2n)}{8}} & e^{j\frac{2\pi(0l'+1m'+2n)}{8}} & e^{j\frac{2\pi(0l+01m+2n)}{8}} & e^{j\frac{2\pi(0l'+1m'+2n)}{8}} \\ e^{j\frac{2\pi(1l+0m+2n)}{8}} & e^{j\frac{2\pi(1l'+0m'+2n)}{8}} & e^{j\frac{2\pi(1l+0m+2n)}{8}} & e^{j\frac{2\pi(1l'+0m'+2n)}{8}} \\ e^{j\frac{2\pi(1l+1m+2n)}{8}} & e^{j\frac{2\pi(1l'+1m'+2n)}{8}} & e^{j\frac{2\pi(1l+1m+2n)}{8}} & e^{j\frac{2\pi(1l'+1m'+2n)}{8}} \end{Bmatrix}$$

-continued $$= \frac{1}{\sqrt{4 \cdot 8}} \left\{ \begin{array}{cccc} e^{j\frac{2\pi(0l+0m)}{16}} & e^{j\frac{2\pi(0l'+0m')}{16}} & e^{j\frac{2\pi(0l+0m)}{16}} & e^{j\frac{2\pi(0l'+0m')}{16}} \\ e^{j\frac{2\pi(0l+2m)}{16}} & e^{j\frac{2\pi(0l'+2m')}{16}} & e^{j\frac{2\pi(0l+2m)}{16}} & e^{j\frac{2\pi(0l'+2m')}{16}} \\ e^{j\frac{2\pi(2l+0m)}{16}} & e^{j\frac{2\pi(2l'+0m')}{16}} & e^{j\frac{2\pi(2l+0m)}{16}} & e^{j\frac{2\pi(2l'+0m')}{16}} \\ e^{j\frac{2\pi(2l+2m)}{16}} & e^{j\frac{2\pi(2l'+2m')}{16}} & e^{j\frac{2\pi(2l+2m)}{16}} & e^{j\frac{2\pi(2l'+2m')}{16}} \\ e^{j\frac{2\pi(0l+0m+4n)}{16}} & e^{j\frac{2\pi(0l'+0m'+4n)}{16}} & e^{j\frac{2\pi(0l+0m+4n)}{16}} & e^{j\frac{2\pi(0l'+0m'+4n)}{16}} \\ e^{j\frac{2\pi(0l+2m+4n)}{16}} & e^{j\frac{2\pi(0l'+2m'+4n)}{16}} & e^{j\frac{2\pi(0l+2m+4n)}{16}} & e^{j\frac{2\pi(0l'+2m'+4n)}{16}} \\ e^{j\frac{2\pi(2l+0m+4n)}{16}} & e^{j\frac{2\pi(2l'+0m'+4n)}{16}} & e^{j\frac{2\pi(2l+0m+4n)}{16}} & e^{j\frac{2\pi(2l'+0m'+4n)}{16}} \\ e^{j\frac{2\pi(2l+2m+4n)}{16}} & e^{j\frac{2\pi(2l'+2m'+4n)}{16}} & e^{j\frac{2\pi(2l+2m+4n)}{16}} & e^{j\frac{2\pi(2l'+2m'+4n)}{16}} \end{array} \right\}$$

In Equation 8, $w_{l,l',m,m',n}$ denotes a precoder defined by variables l, l', m, m', and n, and $P_{CSI-RS}$ denotes the number of antenna ports.

$$W_{l,l',m,m',n} = \frac{1}{\sqrt{4P_{CSI-RS}}} \begin{bmatrix} v_{l,m} & v_{l',m'} & v_{l,m} & v_{l',m'} \\ \varphi_n v_{l,m} & \varphi_n v_{l',m'} & \varphi_n v_{l,m} & \varphi_n v_{l',m'} \end{bmatrix}$$ [Equation 9]

$$= \frac{1}{\sqrt{4 \cdot 4}} \left\{ \begin{array}{cccc} e^{j\frac{2\pi(0l+0m)}{8}} & e^{j\frac{2\pi(0l'+0m')}{8}} & e^{j\frac{2\pi(0l+0m)}{8}} & e^{j\frac{2\pi(0l'+0m')}{8}} \\ e^{j\frac{2\pi(1l+0m)}{8}} & e^{j\frac{2\pi(1l'+0m')}{8}} & e^{j\frac{2\pi(1l+0m)}{8}} & e^{j\frac{2\pi(1l'+0m')}{8}} \\ e^{j\frac{2\pi(0l+0m+2n)}{8}} & e^{j\frac{2\pi(0l'+0m'+2n)}{8}} & e^{j\frac{2\pi(0l+0m+2n)}{8}} & e^{j\frac{2\pi(0l'+0m'+2n)}{8}} \\ e^{j\frac{2\pi(1l+0m+2n)}{8}} & e^{j\frac{2\pi(1l'+0m'+2n)}{8}} & e^{j\frac{2\pi(1l+0m+2n)}{8}} & e^{j\frac{2\pi(1l'+0m'+2n)}{8}} \end{array} \right\}$$

$$= \frac{1}{\sqrt{4 \cdot 4}} \left\{ \begin{array}{cccc} e^{j\frac{2\pi(0l+0m)}{16}} & e^{j\frac{2\pi(0l'+0m')}{16}} & e^{j\frac{2\pi(0l+0m)}{16}} & e^{j\frac{2\pi(0l'+0m')}{16}} \\ e^{j\frac{2\pi(2l+0m)}{16}} & e^{j\frac{2\pi(2l'+0m')}{16}} & e^{j\frac{2\pi(2l+0m)}{16}} & e^{j\frac{2\pi(2l'+0m')}{16}} \\ e^{j\frac{2\pi(0l+0m+4n)}{16}} & e^{j\frac{2\pi(0l'+0m'+4n)}{16}} & e^{j\frac{2\pi(0l+0m+4n)}{16}} & e^{j\frac{2\pi(0l'+0m'+4n)}{16}} \\ e^{j\frac{2\pi(2l+0m+4n)}{16}} & e^{j\frac{2\pi(2l'+0m'+4n)}{16}} & e^{j\frac{2\pi(2l+0m+4n)}{16}} & e^{j\frac{2\pi(2l'+0m'+4n)}{16}} \end{array} \right\}$$

In Equation 9, $w_{l,m,p,n}$ denotes a precoder defined by variables l, m, p, and n, and $P_{CSI-RS}$ denotes the number of antenna ports.

Referring to Equation 3 to Equation 9, an element of a precoder in a codebook in the form of DFT may be provided in the form of $$e^{j\frac{2\pi \cdot \theta(PMIs)}{M}},$$

and may have a + sign or − sign depending on the location of the element in the precoder, that is, a row index and a column index. Here, θ(PMIs) is a function that takes PMI values or values drawn from the PMI values as inputs, and a row and a column may correspond to an antenna port and a layer. A row index and a column index may be expressed as an antenna port number and a layer number. Particularly, each element may have a + sign or − sign depending on a row index and a column index. Here, θ is al+bl'+cm+dm'+ep+fn, and is defined as a linear combination of PMI values or values drawn from the PMI. However, this may be defined as another combination distinct from the linear combination.

Figure 8:
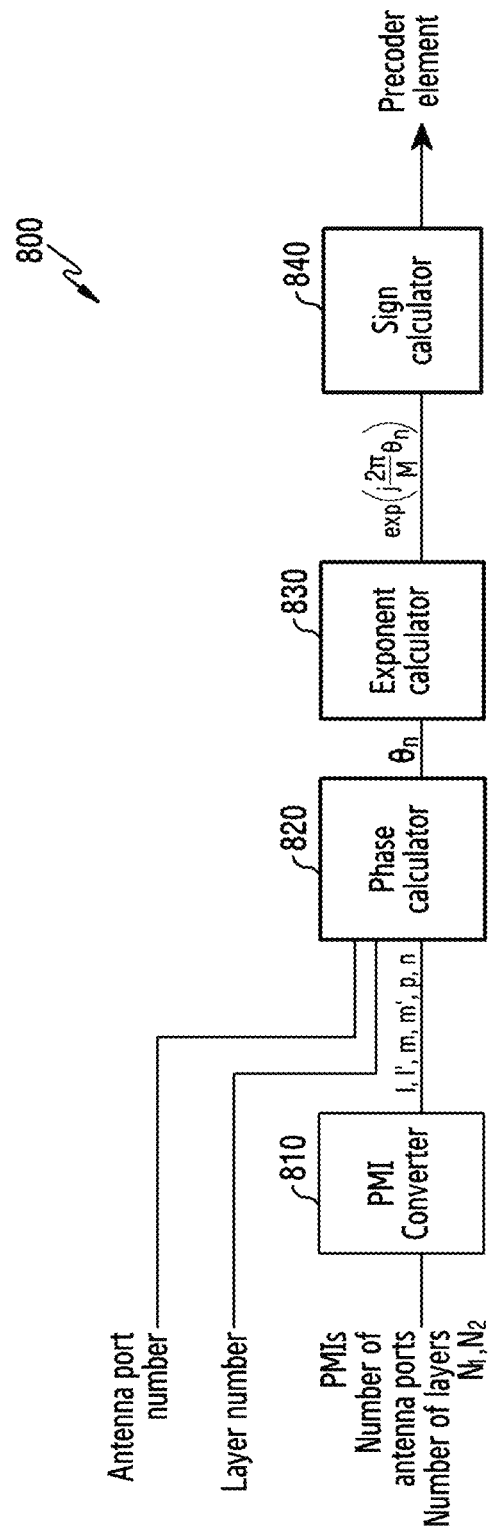
FIG. 8 is a block diagram illustrating a functional configuration of a precoder generator in a wireless communication system according to various embodiments.

Based on the above-described structure of elements, a precoder may be determined via processes of PMI conversion, phase calculation, exponent calculation, and sign calculation, as illustrated in FIG. 8.

FIG. 8 is a diagram illustrating the functional configuration of a precoder generation circuit 800 in a wireless communication system according to various embodiments.

FIG. 8 illustrates the precoder generation circuit 800 for generating a precoder defined as shown in Table 4 to Table 9.

Referring to FIG. 8, the precoder generation circuit 800 may include a PMI converter 810, a phase calculator 820, an exponent calculator 830, and a sign calculator 840.

The PMI converter 810 may determine variables (e.g., l, l', m, m', p, and n) for defining a precoder based on PMIs (e.g., $i_{1,1}$, $i_{1,2}$, $i_{1,3}$, and $i_2$). For example, the PMI converter 810 may identify $k_1$ and $k_2$ defined in Table 2 and Table 3, based on PMIs, and may determine l' and m' by adding $k_1$ and $k_2$ to $i_{1,1}$ and $i_{1,2}$, respectively. The PMI converter 810 may determine l, m, p, and n as l=$i_{1,1}$, m=$i_{1,2}$, p=$i_{1,3}$, and n=$i_2$. The operation of the PMI converter 810 may be designed based on PMIs defined in the 5G NR standard. Therefore, if a different codebook is used, the PMI converter 810 may be omitted or modified.

The phase calculator 820 may determine the phase value of each element of a precoder based on variables. Here, a phase value may be dependent upon an antenna port number and a layer number corresponding to the corresponding element. That is, the phase calculator 820 may determine the phase value of each element based on the antenna port number of the corresponding element, the layer number of the corresponding element, and variables for defining the precoder. Since a phase value is determined by combining variables, the phase calculator 820 may identify combination weights corresponding to the variables from among correspondences between the variables and the combination weights stored in a first memory, and may combine the variables using the identified combination weights so as to determine a phase value. For example, the correspondences shown in Table 14 to Table 20 may be stored in the first memory, and the phase calculator 820 may search the first memory so as to identify combination weights, and may perform multiplication and addition of variables and combination weights according to the row index and the column index of an element of which the phase is to be calculated.

Table 14 lists weights for a codebook corresponding to 4-layer transmission in the case where $P_{CSI-RS}=32$, $N_1=4$, and $N_2=4$.

TABLE 14

| row | col.1 (layer1) | col.2 (layer2) | col.3 (layer3) | col.4 (layer4) | | | | | |
|---|---|---|---|---|---|---|---|---|---|
| (Ant) | a b c d e f | a b c d e f | a b c d e | f | a | b | c | d | e | f |
| 0 | 0 0 0 0 0 0 | 0 0 0 0 0 0 | 0 0 0 0 0 | 0 | 0 | 0 | 0 | 0 | 0 | 0 |
| 1 | 0 0 4 0 0 0 | 0 0 4 0 0 0 | 0 0 4 0 0 | 0 | 0 | 0 | 4 | 0 | 0 | 0 |
| 2 | 2 0 0 0 0 0 | 2 0 0 0 0 0 | 2 0 0 0 0 | 0 | 2 | 0 | 0 | 0 | 0 | 0 |
| 3 | 2 0 4 0 0 0 | 2 0 4 0 0 0 | 2 0 4 0 0 | 0 | 2 | 0 | 4 | 0 | 0 | 0 |
| 4 | 4 0 0 0 0 0 | 4 0 0 0 0 0 | 4 0 0 0 0 | 0 | 4 | 0 | 0 | 0 | 0 | 0 |
| 5 | 4 0 4 0 0 0 | 4 0 4 0 0 0 | 4 0 4 0 0 | 0 | 4 | 0 | 4 | 0 | 0 | 0 |
| 6 | 6 0 0 0 0 0 | 6 0 0 0 0 0 | 6 0 0 0 0 | 0 | 6 | 0 | 0 | 0 | 0 | 0 |
| 7 | 6 0 4 0 0 0 | 6 0 4 0 0 0 | 6 0 4 0 0 | 0 | 6 | 0 | 4 | 0 | 0 | 0 |
| 8 | 0 0 0 0 4 0 | 0 0 0 0 4 0 | 0 0 0 0 4 | 0 | 0 | 0 | 0 | 0 | 4 | 0 |
| 9 | 0 0 4 0 4 0 | 0 0 4 0 4 0 | 0 0 4 0 4 | 0 | 0 | 0 | 4 | 0 | 4 | 0 |
| 10 | 2 0 0 0 4 0 | 2 0 0 0 4 0 | 2 0 0 0 4 | 0 | 2 | 0 | 0 | 0 | 4 | 0 |
| 11 | 2 0 4 0 4 0 | 2 0 4 0 4 0 | 2 0 4 0 4 | 0 | 2 | 0 | 4 | 0 | 4 | 0 |
| 12 | 4 0 0 0 4 0 | 4 0 0 0 4 0 | 4 0 0 0 4 | 0 | 4 | 0 | 0 | 0 | 4 | 0 |
| 13 | 4 0 4 0 4 0 | 4 0 4 0 4 0 | 4 0 4 0 4 | 0 | 4 | 0 | 4 | 0 | 4 | 0 |
| 14 | 6 0 0 0 4 0 | 6 0 0 0 4 0 | 6 0 0 0 4 | 0 | 6 | 0 | 0 | 0 | 4 | 0 |
| 15 | 6 0 4 0 4 0 | 6 0 4 0 4 0 | 6 0 4 0 4 | 0 | 6 | 0 | 4 | 0 | 4 | 0 |
| 16 | 0 0 0 0 0 8 | 0 0 0 0 0 8 | 0 0 0 0 0 | 8 | 0 | 0 | 0 | 0 | 0 | 8 |
| 17 | 0 0 4 0 0 8 | 0 0 4 0 0 8 | 0 0 4 0 0 | 8 | 0 | 0 | 4 | 0 | 0 | 8 |
| 18 | 2 0 0 0 0 8 | 2 0 0 0 0 8 | 2 0 0 0 0 | 8 | 2 | 0 | 0 | 0 | 0 | 8 |
| 19 | 2 0 4 0 0 8 | 2 0 4 0 0 8 | 2 0 4 0 0 | 8 | 2 | 0 | 4 | 0 | 0 | 8 |
| 20 | 4 0 0 0 0 8 | 4 0 0 0 0 8 | 4 0 0 0 0 | 8 | 4 | 0 | 0 | 0 | 0 | 8 |
| 21 | 4 0 4 0 0 8 | 4 0 4 0 0 8 | 4 0 4 0 0 | 8 | 4 | 0 | 4 | 0 | 0 | 8 |
| 22 | 6 0 0 0 0 8 | 6 0 0 0 0 8 | 6 0 0 0 0 | 8 | 6 | 0 | 0 | 0 | 0 | 8 |
| 23 | 6 0 4 0 0 8 | 6 0 4 0 0 8 | 6 0 4 0 0 | 8 | 6 | 0 | 4 | 0 | 0 | 8 |
| 24 | 0 0 0 0 4 8 | 0 0 0 0 4 8 | 0 0 0 0 4 | 8 | 0 | 0 | 0 | 0 | 4 | 8 |
| 25 | 0 0 4 0 4 8 | 0 0 4 0 4 8 | 0 0 4 0 4 | 8 | 0 | 0 | 4 | 0 | 4 | 8 |
| 26 | 2 0 0 0 4 8 | 2 0 0 0 4 8 | 2 0 0 0 4 | 8 | 2 | 0 | 0 | 0 | 4 | 8 |
| 27 | 2 0 4 0 4 8 | 2 0 4 0 4 8 | 2 0 4 0 4 | 8 | 2 | 0 | 4 | 0 | 4 | 8 |
| 28 | 4 0 0 0 4 8 | 4 0 0 0 4 8 | 4 0 0 0 4 | 8 | 4 | 0 | 0 | 0 | 4 | 8 |
| 29 | 4 0 4 0 4 8 | 4 0 4 0 4 8 | 4 0 4 0 4 | 8 | 4 | 0 | 4 | 0 | 4 | 8 |
| 30 | 6 0 0 0 4 8 | 6 0 0 0 4 8 | 6 0 0 0 4 | 8 | 6 | 0 | 0 | 0 | 4 | 8 |
| 31 | 6 0 4 0 4 8 | 6 0 4 0 4 8 | 6 0 4 0 4 | 8 | 6 | 0 | 4 | 0 | 4 | 8 |

Table 15 lists weights for a codebook corresponding to 4-layer transmission in the case where $P_{CSI-RS}=32$, $N_1=8$, and $N_2=2$.

TABLE 15

| row | col.1 (layer1) | col.2 (layer2) | col.3 (layer3) | col.4 (layer4) | | | | | |
|---|---|---|---|---|---|---|---|---|---|
| (Ant) | a b c d e f | a b c d e f | a b c d e | f | a | b | c | d | e | f |
| 0 | 0 0 0 0 0 0 | 0 0 0 0 0 0 | 0 0 0 0 0 | 0 | 0 | 0 | 0 | 0 | 0 | 0 |
| 1 | 0 0 2 0 0 0 | 0 0 2 0 0 0 | 0 0 2 0 0 | 0 | 0 | 0 | 2 | 0 | 0 | 0 |
| 2 | 0 0 4 0 0 0 | 0 0 4 0 0 0 | 0 0 4 0 0 | 0 | 0 | 0 | 4 | 0 | 0 | 0 |
| 3 | 0 0 6 0 0 0 | 0 0 6 0 0 0 | 0 0 6 0 0 | 0 | 0 | 0 | 6 | 0 | 0 | 0 |
| 4 | 4 0 0 0 0 0 | 4 0 0 0 0 0 | 4 0 0 0 0 | 0 | 4 | 0 | 0 | 0 | 0 | 0 |
| 5 | 4 0 2 0 0 0 | 4 0 2 0 0 0 | 4 0 2 0 0 | 0 | 4 | 0 | 2 | 0 | 0 | 0 |
| 6 | 4 0 4 0 0 0 | 4 0 4 0 0 0 | 4 0 4 0 0 | 0 | 4 | 0 | 4 | 0 | 0 | 0 |
| 7 | 4 0 6 0 0 0 | 4 0 6 0 0 0 | 4 0 6 0 0 | 0 | 4 | 0 | 6 | 0 | 0 | 0 |
| 8 | 0 0 0 0 4 0 | 0 0 0 0 4 0 | 0 0 0 0 4 | 0 | 0 | 0 | 0 | 0 | 4 | 0 |
| 9 | 0 0 2 0 4 0 | 0 0 2 0 4 0 | 0 0 2 0 4 | 0 | 0 | 0 | 2 | 0 | 4 | 0 |
| 10 | 0 0 4 0 4 0 | 0 0 4 0 4 0 | 0 0 4 0 4 | 0 | 0 | 0 | 4 | 0 | 4 | 0 |
| 11 | 0 0 6 0 4 0 | 0 0 6 0 4 0 | 0 0 6 0 4 | 0 | 0 | 0 | 6 | 0 | 4 | 0 |
| 12 | 4 0 0 0 4 0 | 4 0 0 0 4 0 | 4 0 0 0 4 | 0 | 4 | 0 | 0 | 0 | 4 | 0 |

TABLE 15-continued

| row | col.1 (layer1) | col.2 (layer2) | col.3 (layer3) | col.4 (layer4) | | | | | |
|---|---|---|---|---|---|---|---|---|---|
| (Ant) | a b c d e f | a b c d e f | a b c d e | f | a | b | c | d | e | f |
| 13 | 4 0 2 0 4 0 | 4 0 2 0 4 0 | 4 0 2 0 4 | 0 | 4 | 0 | 2 | 0 | 4 | 0 |
| 14 | 4 0 4 0 4 0 | 4 0 4 0 4 0 | 4 0 4 0 4 | 0 | 4 | 0 | 4 | 0 | 4 | 0 |
| 15 | 4 0 6 0 4 0 | 4 0 6 0 4 0 | 4 0 6 0 4 | 0 | 4 | 0 | 6 | 0 | 4 | 0 |
| 16 | 0 0 0 0 0 8 | 0 0 0 0 0 8 | 0 0 0 0 0 | 8 | 0 | 0 | 0 | 0 | 0 | 8 |
| 17 | 0 0 2 0 0 8 | 0 0 2 0 0 8 | 0 0 2 0 0 | 8 | 0 | 0 | 2 | 0 | 0 | 8 |
| 18 | 0 0 4 0 0 8 | 0 0 4 0 0 8 | 0 0 4 0 0 | 8 | 0 | 0 | 4 | 0 | 0 | 8 |
| 19 | 0 0 6 0 0 8 | 0 0 6 0 0 8 | 0 0 6 0 0 | 8 | 0 | 0 | 6 | 0 | 0 | 8 |
| 20 | 4 0 0 0 0 8 | 4 0 0 0 0 8 | 4 0 0 0 0 | 8 | 4 | 0 | 0 | 0 | 0 | 8 |
| 21 | 4 0 2 0 0 8 | 4 0 2 0 0 8 | 4 0 2 0 0 | 8 | 4 | 0 | 2 | 0 | 0 | 8 |
| 22 | 4 0 4 0 0 8 | 4 0 4 0 0 8 | 4 0 4 0 0 | 8 | 4 | 0 | 4 | 0 | 0 | 8 |
| 23 | 4 0 6 0 0 8 | 4 0 6 0 0 8 | 4 0 6 0 0 | 8 | 4 | 0 | 6 | 0 | 0 | 8 |
| 24 | 0 0 0 0 4 8 | 0 0 0 0 4 8 | 0 0 0 0 4 | 8 | 0 | 0 | 0 | 0 | 4 | 8 |
| 25 | 0 0 2 0 4 8 | 0 0 2 0 4 8 | 0 0 2 0 4 | 8 | 0 | 0 | 2 | 0 | 4 | 8 |
| 26 | 0 0 4 0 4 8 | 0 0 4 0 4 8 | 0 0 4 0 4 | 8 | 0 | 0 | 4 | 0 | 4 | 8 |
| 27 | 0 0 6 0 4 8 | 0 0 6 0 4 8 | 0 0 6 0 4 | 8 | 0 | 0 | 6 | 0 | 4 | 8 |
| 28 | 4 0 0 0 4 8 | 4 0 0 0 4 8 | 4 0 0 0 4 | 8 | 4 | 0 | 0 | 0 | 4 | 8 |
| 29 | 4 0 2 0 4 8 | 4 0 2 0 4 8 | 4 0 2 0 4 | 8 | 4 | 0 | 2 | 0 | 4 | 8 |
| 30 | 4 0 4 0 4 8 | 4 0 4 0 4 8 | 4 0 4 0 4 | 8 | 4 | 0 | 4 | 0 | 4 | 8 |
| 31 | 4 0 6 0 4 8 | 4 0 6 0 4 8 | 4 0 6 0 4 | 8 | 4 | 0 | 6 | 0 | 4 | 8 |

Table 16 lists weights for a codebook corresponding to 4-layer transmission in the case where $P_{CSI-RS}=16$, $N_1=4$, and $N_2=2$.

TABLE 16

| row | col.1 (layer1) | col.2 (layer2) | col.3 (layer3) | col.4 (layer4) | | | | | |
|---|---|---|---|---|---|---|---|---|---|
| (Ant) | a b c d e f | a b c d e f | a b c d e | f | a | b | c | d | e | f |
| 0 | 0 0 0 0 0 0 | 0 0 0 0 0 0 | 0 0 0 0 0 | 0 | 0 | 0 | 0 | 0 | 0 | 0 |
| 1 | 2 0 0 0 0 0 | 2 0 0 0 0 0 | 2 0 0 0 0 | 0 | 2 | 0 | 0 | 0 | 0 | 0 |
| 2 | 4 0 0 0 0 0 | 4 0 0 0 0 0 | 4 0 0 0 0 | 0 | 4 | 0 | 0 | 0 | 0 | 0 |
| 3 | 6 0 0 0 0 0 | 6 0 0 0 0 0 | 6 0 0 0 0 | 0 | 6 | 0 | 0 | 0 | 0 | 0 |
| 4 | 0 0 0 0 4 0 | 0 0 0 0 4 0 | 0 0 0 0 4 | 0 | 0 | 0 | 0 | 0 | 4 | 0 |
| 5 | 2 0 0 0 4 0 | 2 0 0 0 4 0 | 2 0 0 0 4 | 0 | 2 | 0 | 0 | 0 | 4 | 0 |
| 6 | 4 0 0 0 4 0 | 4 0 0 0 4 0 | 4 0 0 0 4 | 0 | 4 | 0 | 0 | 0 | 4 | 0 |
| 7 | 6 0 0 0 4 0 | 6 0 0 0 4 0 | 6 0 0 0 4 | 0 | 6 | 0 | 0 | 0 | 4 | 0 |
| 8 | 0 0 0 0 0 8 | 0 0 0 0 0 8 | 0 0 0 0 0 | 8 | 0 | 0 | 0 | 0 | 0 | 8 |
| 9 | 2 0 0 0 0 8 | 2 0 0 0 0 8 | 2 0 0 0 0 | 8 | 2 | 0 | 0 | 0 | 0 | 8 |
| 10 | 4 0 0 0 0 8 | 4 0 0 0 0 8 | 4 0 0 0 0 | 8 | 4 | 0 | 0 | 0 | 0 | 8 |
| 11 | 6 0 0 0 0 8 | 6 0 0 0 0 8 | 6 0 0 0 0 | 8 | 6 | 0 | 0 | 0 | 0 | 8 |
| 12 | 0 0 0 0 4 8 | 0 0 0 0 4 8 | 0 0 0 0 4 | 8 | 0 | 0 | 0 | 0 | 4 | 8 |
| 13 | 2 0 0 0 4 8 | 2 0 0 0 4 8 | 2 0 0 0 4 | 8 | 2 | 0 | 0 | 0 | 4 | 8 |
| 14 | 4 0 0 0 4 8 | 4 0 0 0 4 8 | 4 0 0 0 4 | 8 | 4 | 0 | 0 | 0 | 4 | 8 |
| 15 | 6 0 0 0 4 8 | 6 0 0 0 4 8 | 6 0 0 0 4 | 8 | 6 | 0 | 0 | 0 | 4 | 8 |

Table 17 lists weights for a codebook corresponding to 4-layer transmission in the case where $P_{CSI-RS}=16$, $N_1=8$, and $N_2=1$.

TABLE 17

| row | col.1 (layer1) | col.2 (layer2) | col.3 (layer3) | col.4 (layer4) | | | | | |
|---|---|---|---|---|---|---|---|---|---|
| (Ant) | a b c d e f | a b c d e f | a b c d e | f | a | b | c | d | e | f |
| 0 | 0 0 0 0 0 0 | 0 0 0 0 0 0 | 0 0 0 0 0 | 0 | 0 | 0 | 0 | 0 | 0 | 0 |
| 1 | 0 0 4 0 0 0 | 0 0 4 0 0 0 | 0 0 4 0 0 | 0 | 0 | 0 | 4 | 0 | 0 | 0 |
| 2 | 4 0 0 0 0 0 | 4 0 0 0 0 0 | 4 0 0 0 0 | 0 | 4 | 0 | 0 | 0 | 0 | 0 |
| 3 | 4 0 4 0 0 0 | 4 0 4 0 0 0 | 4 0 4 0 0 | 0 | 4 | 0 | 4 | 0 | 0 | 0 |
| 4 | 0 0 0 0 4 0 | 0 0 0 0 4 0 | 0 0 0 0 4 | 0 | 0 | 0 | 0 | 0 | 4 | 0 |
| 5 | 0 0 4 0 4 0 | 0 0 4 0 4 0 | 0 0 4 0 4 | 0 | 0 | 0 | 4 | 0 | 4 | 0 |
| 6 | 4 0 0 0 4 0 | 4 0 0 0 4 0 | 4 0 0 0 4 | 0 | 4 | 0 | 0 | 0 | 4 | 0 |
| 7 | 4 0 4 0 4 0 | 4 0 4 0 4 0 | 4 0 4 0 4 | 0 | 4 | 0 | 4 | 0 | 4 | 0 |
| 8 | 0 0 0 0 0 8 | 0 0 0 0 0 8 | 0 0 0 0 0 | 8 | 0 | 0 | 0 | 0 | 0 | 8 |
| 9 | 0 0 4 0 0 8 | 0 0 4 0 0 8 | 0 0 4 0 0 | 8 | 0 | 0 | 4 | 0 | 0 | 8 |
| 10 | 4 0 0 0 0 8 | 4 0 0 0 0 8 | 4 0 0 0 0 | 8 | 4 | 0 | 0 | 0 | 0 | 8 |
| 11 | 4 0 4 0 0 8 | 4 0 4 0 0 8 | 4 0 4 0 0 | 8 | 4 | 0 | 4 | 0 | 0 | 8 |

TABLE 17-continued

| row | col.1 (layer1) | col.2 (layer2) | col.3 (layer3) | col.4 (layer4) |
|---|---|---|---|---|
| (Ant) | a b c d e f | a b c d e f | a b c d e | f a b c d e f |
| 12 | 0 0 0 0 4 8 | 0 0 0 0 4 8 | 0 0 0 0 4 | 8 0 0 0 0 4 8 |
| 13 | 0 0 4 0 4 8 | 0 0 4 0 4 8 | 0 0 4 0 4 | 8 0 0 4 0 4 8 |
| 14 | 4 0 0 0 4 8 | 4 0 0 0 4 8 | 4 0 0 0 4 | 8 4 0 0 0 4 8 |
| 15 | 4 0 4 0 4 8 | 4 0 4 0 4 8 | 4 0 4 0 4 | 8 4 0 4 0 4 8 |

Table 18 lists weights for a codebook corresponding to 4-layer transmission in the case where $P_{CSI-RS}=8$, $N_1=4$, and $N_2=1$.

TABLE 18

| row | col.1 (layer1) | col.2 (layer2) | col.3 (layer3) | col.4 (layer4) |
|---|---|---|---|---|
| (port) | a b c d e f | a b c d e f | a b c d e | f a b c d e f |
| 0 | 0 0 0 0 0 0 | 0 0 0 0 0 0 | 0 0 0 0 0 | 0 0 0 0 0 0 0 |
| 1 | 2 0 0 0 0 0 | 2 0 0 0 0 0 | 2 0 0 0 0 | 0 0 2 0 0 0 0 |
| 2 | 4 0 0 0 0 0 | 4 0 0 0 0 0 | 4 0 0 0 0 | 0 0 4 0 0 0 0 |
| 3 | 6 0 0 0 0 0 | 6 0 0 0 0 0 | 6 0 0 0 0 | 0 0 6 0 0 0 0 |
| 4 | 0 0 0 0 8 0 | 0 0 0 0 8 0 | 0 0 0 0 8 | 0 8 0 0 0 0 8 |
| 5 | 2 0 0 0 8 0 | 2 0 0 0 8 0 | 2 0 0 0 8 | 0 8 0 2 0 0 0 8 |
| 6 | 4 0 0 0 8 0 | 4 0 0 0 8 0 | 4 0 0 0 8 | 0 8 0 4 0 0 0 8 |
| 7 | 6 0 0 0 8 0 | 6 0 0 0 8 0 | 6 0 0 0 8 | 0 8 0 6 0 0 0 8 |

Table 19 lists weights for a codebook corresponding to 4-layer transmission in the case where $P_{CSI-RS}=8$, $N_1=2$, and $N_2=2$.

TABLE 19

| row | col.1 (layer1) | col.2 (layer2) | col.3 (layer3) | col.4 (layer4) |
|---|---|---|---|---|
| (port) | a b c d e f | a b c d e f | a b c d e | f a b c d e f |
| 0 | 0 0 0 0 0 0 | 0 0 0 0 0 0 | 0 0 0 0 0 | 0 0 0 0 0 0 0 |
| 1 | 0 0 4 0 0 0 | 0 0 4 0 0 0 | 0 0 4 0 0 | 0 0 0 0 4 0 0 |
| 2 | 4 0 0 0 0 0 | 4 0 0 0 0 0 | 4 0 0 0 0 | 0 0 4 0 0 0 0 |
| 3 | 4 0 4 0 0 0 | 4 0 4 0 0 0 | 4 0 4 0 0 | 0 0 4 0 4 0 0 |
| 4 | 0 0 0 0 8 0 | 0 0 0 0 8 0 | 0 0 0 0 8 | 0 8 0 0 0 0 8 |
| 5 | 0 0 4 0 0 8 0 0 0 0 4 0 8 0 0 4 0 0 | | | 0 8 0 0 0 4 0 8 |
| 6 | 4 0 0 0 8 0 | 4 0 0 0 8 0 | 4 0 0 0 8 | 0 8 0 4 0 0 0 8 |
| 7 | 4 0 4 0 0 8 0 4 0 4 0 8 0 4 0 4 0 0 | | | 8 0 4 0 4 0 8 |

Table 20 lists weights for a codebook corresponding to 4-layer transmission in the case where $P_{CSI-RS}=4$, $N_1=2$, and $N_2=1$.

TABLE 20

| row | col.1 (layer1) | col.2 (layer2) | col.3 (layer3) | col.4 (layer4) |
|---|---|---|---|---|
| (port) | a b c d e f | a b c d e f | a b c d e | f a b c d e f |
| 0 | 0 0 0 0 0 0 | 0 0 0 0 0 0 | 0 0 0 0 0 | 0 0 0 0 0 0 0 |
| 1 | 4 0 0 0 0 0 | 4 0 0 0 0 0 | 4 0 0 0 0 | 0 0 4 0 0 0 0 |
| 2 | 0 0 0 0 8 0 | 0 0 0 0 8 0 | 0 0 0 0 8 | 0 8 0 0 0 0 8 |
| 3 | 4 0 0 0 8 0 | 4 0 0 0 8 0 | 4 0 0 0 8 | 0 8 0 4 0 0 0 8 |

The exponent calculator 830 determines an exponent included in an element of a precoder. For example, the exponent calculator 830 determines an exponent $\exp(j(2\pi\theta)/M)$ using a phase value $\theta_n$ calculated by the phase calculator 820. Here, M is a common multiple of the number of antenna ports supported by a codebook. If a codebook such as that shown in Table 4 to Table 9 is used, the number of antenna ports is 4, 8, 16, or 32, and thus M=64. Also, since a modulo operation is applied to a phase $(2\pi\theta)/M$, $\exp(j(2\pi\theta)/M)$ may be determined to be one of 64 values depending on a change in the value of θ. $\exp(j(2\pi\theta)/M)$ may be expressed according to Euler's formula. That is, $\exp(j(2\pi\theta)/M)$ may be expressed as a combination of a sine wave and a cosine wave, and thus, the exponent calculator 830 may use a second memory that stores a correspondence between a phase value and a sine wave size/cosine wave size, as shown in Table 21 provided below.

TABLE 21

| Theta | cos | sin |
|---|---|---|
| 0 | 256 | 0 |
| 1 | 255 | 25 |
| 2 | 251 | 50 |
| 3 | 245 | 74 |
| 4 | 237 | 98 |
| 5 | 226 | 121 |
| 6 | 213 | 142 |
| 7 | 198 | 162 |
| 8 | 181 | 181 |
| 9 | 162 | 198 |
| 10 | 142 | 213 |
| 11 | 121 | 226 |
| 12 | 98 | 237 |
| 13 | 74 | 245 |
| 14 | 50 | 251 |
| 15 | 25 | 255 |
| 16 | 0 | 256 |
| 17 | −25 | 255 |
| 18 | −50 | 251 |
| 19 | −74 | 245 |
| 20 | −98 | 237 |
| 21 | −121 | 226 |
| 22 | −142 | 213 |
| 23 | −162 | 198 |
| 24 | −181 | 181 |
| 25 | −198 | 162 |
| 26 | −213 | 142 |
| 27 | −226 | 121 |
| 28 | −237 | 98 |
| 29 | −245 | 74 |
| 30 | −251 | 50 |
| 31 | −255 | 25 |
| 32 | −256 | 0 |
| 33 | −255 | −25 |
| 34 | −251 | −50 |
| 35 | −245 | −74 |
| 36 | −237 | −98 |
| 37 | −226 | −121 |
| 38 | −213 | −142 |
| 39 | −198 | −162 |
| 40 | −181 | −181 |
| 41 | −162 | −198 |
| 42 | −142 | −213 |
| 43 | −121 | −226 |
| 44 | −98 | −237 |
| 45 | −74 | −245 |
| 46 | −50 | −251 |
| 47 | −25 | −255 |
| 48 | 0 | −256 |
| 49 | 25 | −255 |
| 50 | 50 | −251 |
| 51 | 74 | −245 |
| 52 | 98 | −237 |
| 53 | 121 | −226 |
| 54 | 142 | −213 |
| 55 | 162 | −198 |
| 56 | 181 | −181 |
| 57 | 198 | −162 |
| 58 | 213 | −142 |
| 59 | 226 | −121 |
| 60 | 237 | −98 |
| 61 | 245 | −74 |
| 62 | 251 | −50 |
| 63 | 255 | −25 |

Table 21 is an example of a sine wave size/cosine wave size scaled to be appropriate for 9 bits of output.

The sign calculator 840 may determine the sign of an exponent. The sign calculator 840 may identify the sign of a corresponding element from a third memory that stores the sign of an element according to an antenna port location and a layer location of the corresponding element. The sign calculator 840 may multiply an output value of the exponent calculator 830 by a sign according to the antenna port location and the layer location of a precoder element, the sign of which is desired to be calculated. The correspondence between a sign and an antenna port/layer location may be defined as shown in Table 22 to Table 25.

Table 22 lists signs based on antenna port/layer locations in the case of 4-layer transmission.

TABLE 22

| row | PCSI-RS = 32 | | | | PCSI-RS = 16 | | | | PCSI-RS = 8 | | | | PCSI-RS = 4 | | | |
|---|---|---|---|---|---|---|---|---|---|---|---|---|---|---|---|---|
| (Ant) | L1 | L2 | L3 | L4 | L1 | L2 | L3 | L4 | L1 | L2 | L3 | L4 | L1 | L2 | L3 | L4 |
| 0 | + | + | + | + | + | + | + | + | + | + | + | + | + | + | + | + |
| 1 | + | + | + | + | + | + | + | + | + | + | + | + | + | + | + | + |
| 2 | + | + | + | + | + | + | + | + | + | + | + | + | + | + | − | − |
| 3 | + | + | + | + | + | + | + | + | + | + | + | + | + | + | − | − |
| 4 | + | + | + | + | + | − | + | − | + | + | − | − | | | | |
| 5 | + | + | + | + | + | − | + | − | + | + | − | − | | | | |
| 6 | + | + | + | + | + | − | + | − | + | + | − | − | | | | |
| 7 | + | + | + | + | + | − | + | − | + | + | − | − | | | | |
| 8 | + | − | + | − | + | + | − | − | | | | | | | | |
| 9 | + | − | + | − | + | + | − | − | | | | | | | | |
| 10 | + | − | + | − | + | + | − | − | | | | | | | | |
| 11 | + | − | + | − | + | + | − | − | | | | | | | | |
| 12 | + | − | + | − | + | − | − | + | | | | | | | | |
| 13 | + | − | + | − | + | − | − | + | | | | | | | | |
| 14 | + | − | + | − | + | − | − | + | | | | | | | | |
| 15 | + | − | + | − | + | − | − | + | | | | | | | | |
| 16 | + | + | − | − | | | | | | | | | | | | |
| 17 | + | + | − | − | | | | | | | | | | | | |
| 18 | + | + | − | − | | | | | | | | | | | | |
| 19 | + | + | − | − | | | | | | | | | | | | |
| 20 | + | + | − | − | | | | | | | | | | | | |
| 21 | + | + | − | − | | | | | | | | | | | | |
| 22 | + | + | − | − | | | | | | | | | | | | |
| 23 | + | + | − | − | | | | | | | | | | | | |
| 24 | + | − | − | + | | | | | | | | | | | | |
| 25 | + | − | − | + | | | | | | | | | | | | |
| 26 | + | − | − | + | | | | | | | | | | | | |
| 27 | + | − | − | + | | | | | | | | | | | | |
| 28 | + | − | − | + | | | | | | | | | | | | |
| 29 | + | − | − | + | | | | | | | | | | | | |
| 30 | + | − | − | + | | | | | | | | | | | | |
| 31 | + | − | − | + | | | | | | | | | | | | |

Table 23 lists signs based on antenna port/layer locations in the case of 3-layer transmission.

TABLE 23

| row | PCSI-RS = 32 | | | PCSI-RS = 16 | | | PCSI-RS = 8 | | | PCSI-RS = 4 | | |
|---|---|---|---|---|---|---|---|---|---|---|---|---|
| (Ant) | L1 | L2 | L3 | L1 | L2 | L3 | L1 | L2 | L3 | L1 | L2 | L3 |
| 0 | + | + | + | + | + | + | + | + | + | + | + | + |
| 1 | + | + | + | + | + | + | + | + | + | + | + | + |
| 2 | + | + | + | + | + | + | + | + | + | + | + | − |
| 3 | + | + | + | + | + | + | + | + | + | + | + | − |
| 4 | + | + | + | + | − | + | + | + | − | | | |
| 5 | + | + | + | + | − | + | + | + | − | | | |
| 6 | + | + | + | + | − | + | + | + | − | | | |
| 7 | + | + | + | + | − | + | + | + | − | | | |
| 8 | + | − | + | + | + | − | | | | | | |
| 9 | + | − | + | + | + | − | | | | | | |
| 10 | + | − | + | + | + | − | | | | | | |
| 11 | + | − | + | + | + | − | | | | | | |
| 12 | + | − | + | + | − | − | | | | | | |
| 13 | + | − | + | + | − | − | | | | | | |
| 14 | + | − | + | + | − | − | | | | | | |
| 15 | + | − | + | + | − | − | | | | | | |
| 16 | + | + | − | | | | | | | | | |
| 17 | + | + | − | | | | | | | | | |
| 18 | + | + | − | | | | | | | | | |
| 19 | + | + | − | | | | | | | | | |
| 20 | + | + | − | | | | | | | | | |
| 21 | + | + | − | | | | | | | | | |
| 22 | + | + | − | | | | | | | | | |
| 23 | + | + | − | | | | | | | | | |
| 24 | + | − | − | | | | | | | | | |
| 25 | + | − | − | | | | | | | | | |
| 26 | + | − | − | | | | | | | | | |
| 27 | + | − | − | | | | | | | | | |
| 28 | + | − | − | | | | | | | | | |
| 29 | + | − | − | | | | | | | | | |
| 30 | + | − | − | | | | | | | | | |
| 31 | + | − | − | | | | | | | | | |

Table 24 lists signs based on antenna port/layer locations in the case of 2-layer transmission.

TABLE 24

| row (Ant) | PCSI-RS = 32 L1 | PCSI-RS = 32 L2 | PCSI-RS = 16 L1 | PCSI-RS = 16 L2 | PCSI-RS = 8 L1 | PCSI-RS = 8 L2 | PCSI-RS = 4 L1 | PCSI-RS = 4 L2 |
|---|---|---|---|---|---|---|---|---|
| 0 | + | + | + | + | + | + | + | + |
| 1 | + | + | + | + | + | + | + | + |
| 2 | + | + | + | + | + | + | + | − |
| 3 | + | + | + | + | + | + | + | − |
| 4 | + | + | + | + | + | − | | |
| 5 | + | + | + | + | + | − | | |
| 6 | + | + | + | + | + | − | | |
| 7 | + | + | + | + | + | − | | |
| 8 | + | + | + | − | | | | |
| 9 | + | + | + | − | | | | |
| 10 | + | + | + | − | | | | |
| 11 | + | + | + | − | | | | |
| 12 | + | + | + | − | | | | |
| 13 | + | + | + | − | | | | |
| 14 | + | + | + | − | | | | |
| 15 | + | + | + | − | | | | |
| 16 | + | − | | | | | | |
| 17 | + | − | | | | | | |
| 18 | + | − | | | | | | |
| 19 | + | − | | | | | | |
| 20 | + | − | | | | | | |
| 21 | + | − | | | | | | |
| 22 | + | − | | | | | | |
| 23 | + | − | | | | | | |
| 24 | + | − | | | | | | |
| 25 | + | − | | | | | | |
| 26 | + | − | | | | | | |
| 27 | + | − | | | | | | |
| 28 | + | − | | | | | | |
| 29 | + | − | | | | | | |
| 30 | + | − | | | | | | |
| 31 | + | − | | | | | | |

Table 25 lists signs based on antenna port/layer locations in the case of 1-layer transmission.

TABLE 25

| row (Ant) | PCSI-RS = 32 L1 | PCSI-RS = 16 L1 | PCSI-RS = 8 L1 | PCSI-RS = 4 L1 |
|---|---|---|---|---|
| 0 | + | + | + | + |
| 1 | + | + | + | + |
| 2 | + | + | + | + |
| 3 | + | + | + | + |
| 4 | + | + | + | |
| 5 | + | + | + | |
| 6 | + | + | + | |
| 7 | + | + | + | |
| 8 | + | + | | |
| 9 | + | + | | |
| 10 | + | + | | |
| 11 | + | + | | |
| 12 | + | + | | |
| 13 | + | + | | |
| 14 | + | + | | |
| 15 | + | + | | |
| 16 | + | | | |
| 17 | + | | | |
| 18 | + | | | |
| 19 | + | | | |
| 20 | + | | | |
| 21 | + | | | |
| 22 | + | | | |
| 23 | + | | | |
| 24 | + | | | |
| 25 | + | | | |
| 26 | + | | | |
| 27 | + | | | |
| 28 | + | | | |
| 29 | + | | | |
| 30 | + | | | |
| 31 | + | | | |

The codebook generation circuit 800 that has been described with reference to FIG. 8 may include the phase calculator 820, the exponent calculator 830, and the sign calculator 840. However, according to other embodiments, a precoder includes a plurality of elements, and thus a plurality of phase calculators, a plurality of exponent calculators, and a plurality of sign calculators may be included for quick calculation. For example, in order to calculate a precoder including 8 elements, 8 phase calculators, 8 exponent calculators, and 8 sign calculators may calculate 8 elements at the same time. If an FPGA or DSP included in a circuit operates quickly enough to calculate four elements within a predetermined period of time, two phase calculators, two exponent calculators, and two sign calculators may repeatedly perform operations 4 times.

According to an embodiment, a plurality of phase calculators may share a single first memory. In this instance, the plurality of phase calculators may include only a circuit for an operation, and an interface accessible to the first memory may be included. Alternatively, one of the plurality of phase calculators includes the first memory and the remaining phase calculators may include an interface for accessing the first memory. According to another embodiment, each of the plurality of phase calculators may include an independent first memory. According to various embodiments, a plurality of exponent calculators and a plurality of sign calculators may independently use or share a memory for determining an exponent or a sign.

When the above-described embodiments are applied to the case in which a codebook mode=1 of 3GPP TS 38.214 is used, layer 1 to 4 are used, and the number of antenna ports is 4, 8, 16, and 32, the result of comparing required memory capacities may be as shown below. If all values of a codebook are stored in memory, the required memory capacity is 21,903,360 bits, as shown in Table 26, whereas the memory capacity required for the scheme of the disclosure is 12,520 bits, as shown in Table 27.

TABLE 26

| | Number of antenna ports | Number of $i_{1,1}$ | Number of $i_{1,2}$ | Number of $i_{1,3}$ | Number of $i_2$ | Number of precoders = $i_{1,1} * i_{1,2} * i_{1,3} * i_2$ | Memory capacity (bits) = number of precoders * number of antenna ports * number of layers * 2(I/Q) × 16(output size) |
|---|---|---|---|---|---|---|---|
| One layer transmission | 32 | 16 | 16 | 4 | 1 | 1,024 | 1,048,576 |
| | 32 | 32 | 8 | 4 | 1 | 1,024 | 1,048,576 |
| | 16 | 16 | 8 | 4 | 1 | 512 | 262,144 |
| | 16 | 32 | 1 | 4 | 1 | 128 | 65,536 |
| | 8 | 8 | 8 | 4 | 1 | 256 | 65,536 |
| | 8 | 16 | 1 | 4 | 1 | 64 | 16,384 |
| | 4 | 8 | 1 | 4 | 1 | 32 | 4,096 |
| Two layer transmission | 32 | 16 | 16 | 2 | 4 | 2,048 | 4,194,304 |
| | 32 | 32 | 8 | 2 | 4 | 2,048 | 4,194,304 |
| | 16 | 16 | 8 | 2 | 4 | 1,024 | 1,048,576 |
| | 16 | 32 | 1 | 2 | 4 | 256 | 262,144 |
| | 8 | 8 | 8 | 2 | 4 | 512 | 262,144 |
| | 8 | 16 | 1 | 2 | 4 | 128 | 65,536 |
| | 4 | 8 | 1 | 2 | 1 | 16 | 4,096 |
| Three layer transmission | 32 | 16 | 16 | 2 | 1 | 512 | 1,572,864 |
| | 32 | 32 | 8 | 2 | 1 | 512 | 1,572,864 |
| | 16 | 16 | 8 | 2 | 1 | 256 | 393,216 |
| | 16 | 32 | 1 | 2 | 1 | 64 | 98,304 |
| | 8 | 8 | 8 | 2 | 3 | 384 | 294,912 |
| | 8 | 16 | 1 | 2 | 3 | 96 | 73,728 |
| | 4 | 8 | 1 | 2 | 1 | 16 | 6,144 |
| Four layer transmission | 32 | 16 | 16 | 2 | 1 | 512 | 2,097,152 |
| | 32 | 32 | 8 | 2 | 1 | 512 | 2,097,152 |
| | 16 | 16 | 8 | 2 | 1 | 256 | 524,288 |
| | 16 | 32 | 1 | 2 | 1 | 64 | 131,072 |
| | 8 | 8 | 8 | 2 | 3 | 384 | 393,216 |
| | 8 | 16 | 1 | 2 | 3 | 96 | 98,304 |
| | 4 | 8 | 1 | 2 | 1 | 16 | 8,192 |
| Total number | | | | | | 12,752 | 21,903,360 |

TABLE 27

| | Number of antenna ports | a,b,c,d,e,f bit size | Number of a~f | Number of layers | Memory capacity (bits) = number of antenna ports *a~f bit size* number of a+~f * number of layers * 2(I/Q) |
|---|---|---|---|---|---|
| 1, 2, 3, 4 layer transmission (cross usage) | 32 | 4 | 6 | 4 | 3,072 |
| | 32 | 4 | 6 | 4 | 3,072 |
| | 16 | 4 | 6 | 4 | 1,536 |
| | 16 | 4 | 6 | 4 | 1,536 |
| | 8 | 4 | 6 | 4 | 768 |
| | 8 | 4 | 6 | 4 | 768 |
| | 4 | 4 | 6 | 4 | 384 |
| sign bit capacity | 1,3,4 layer transmission | | | | 240 |
| | 2 layer transmission | | | | 120 |
| cos, sin table capacity | Cos table | | | | 512 |
| | Sin table | | | | 512 |
| Total memory capacity | | | | | 12,520 |

With reference to Table 26 and Table 27, the above-described embodiments may provide a significant reduction in memory consumption.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a base station in a wireless communication system, the method comprising:
obtaining a plurality of indicators corresponding to a precoder;
precoding a signal transmitted to a terminal using the precoder; and
transmitting the precoded signal to the terminal,
wherein the precoder comprises a plurality of elements,
wherein each of the plurality of elements is defined by a combination of a phase value, an exponential value, or a sign, determined by combining variables determined based on the plurality of indicators, and
wherein the precoder is determined by searching at least one of a first memory that stores coefficients for combining the variables corresponding to an antenna port and a layer, a second memory that stores a size of a sine wave and a size of a cosine wave corresponding to the phase value, and a third memory that stores the sign corresponding to a combination of the antenna port and the layer.

2. The method of claim 1, wherein:
the first memory is used for determining the phase value of each of the plurality of elements;
the second memory is used for determining the exponential value of each of the plurality of elements; and
the third memory is used for determining the sign of each of the plurality of elements.

3. The method of claim 1, further comprising:
searching the first memory using an antenna port number and a layer number corresponding to a first element to identify coefficients for the first element; and
determining the phase value of the first element by linearly combining the variables using the coefficients.

4. The method of claim 1, further comprising:
searching the second memory using the phase value of a first element to identify the size of the sine wave and the size of the cosine wave corresponding to the exponential value of the first element; and
determining the exponential value of the first element based on the size of the sine wave and the size of the cosine wave.

5. The method of claim 1, further comprising searching the third memory using an antenna port number and a layer number corresponding to a first element to identify the sign of the first element.

6. The method of claim 1, further comprising:
determining a part of the variables by changing a part of the indicators; and
determining a remaining part of the variables by applying a remaining part of the indicators.

7. The method of claim 1, wherein the first memory stores a plurality of pieces of information corresponding to combinations of a number of layers, a number of antenna ports, or an antenna shape; and
the third memory stores a plurality of pieces of information corresponding to combinations of the number of layers or the number of antenna ports.

8. The method of claim 1, wherein obtaining the plurality of indicators comprises receiving a report including the plurality of indicators from the terminal.

9. The method of claim 1, wherein obtaining the plurality of indicators comprises:
estimating channel information using a reference signal received from the terminal; and
determining the plurality of indicators based on the channel information.

10. The method of claim 1, wherein obtaining the plurality of indicators comprises:
receiving channel information from the terminal; and
determining the plurality of indicators based on the channel information.

11. A base station in a wireless communication system, the base station comprising:
a memory comprising a first memory, a second memory, and a third memory;
a transceiver; and
at least one processor connected to the memory and the transceiver, the at least one processor configured to:
obtain a plurality of indicators corresponding to a precoder;
precode a signal transmitted to a terminal using the precoder; and
transmit the precoded signal to the terminal,
wherein the precoder comprises a plurality of elements,
wherein each of the plurality of elements is defined by a combination of a phase value, an exponential value, or a sign, determined by combining variables determined based on the plurality of indicators, and
wherein the precoder is determined by searching at least one of the first memory that stores coefficients for combining the variables corresponding to an antenna port and a layer, the second memory that stores a size of a sine wave and a size of a cosine wave corresponding to the phase value, and the third memory that stores the sign corresponding to a combination of the antenna port and the layer.

12. The base station of claim 11, wherein the first memory is used for determining the phase value of each of the plurality of elements;
the second memory is used for determining the exponential value of each of the plurality of elements; and
the third memory is used for determining the sign of each of the plurality of elements.

13. The base station of claim 11, wherein the at least one processor is further configured to:
search the first memory using an antenna port number and a layer number corresponding to a first element to identify coefficients for the first element; and
determine the phase value of the first element by linearly combining the variables using the coefficients.

14. The base station of claim 11, wherein the at least one processor is further configured to:
search the second memory using the phase value of a first element to identify the size of the sine wave and the size of the cosine wave corresponding to the exponential value of the first element; and
determine the exponential value of the first element based on the size of the sine wave and the size of the cosine wave.

15. The base station of claim 11, wherein the at least one processor is further configured to search the third memory using an antenna port number and a layer number corresponding to a first element to identify the sign of the first element.

16. The base station of claim 11, wherein the at least one processor is further configured to:
   determine a part of the variables by changing a part of the indicators; and
   determine a remaining part of the variables by applying a remaining part of the indicators.

17. The base station of claim 11, wherein the first memory stores a plurality of pieces of information corresponding to combinations of a number of layers, a number of antenna ports, or an antenna shape; and
   the third memory stores a plurality of pieces of information corresponding to combinations of the number of layers or the number of antenna ports.

18. The base station of claim 11, wherein the at least one processor is further configured to receive a report including the plurality of indicators from the terminal.

19. The base station of claim 11, wherein the at least one processor is further configured to:
   estimate channel information using a reference signal received from the terminal; and
   determine the plurality of indicators based on the channel information.

20. The base station of claim 11, wherein the at least one processor is further configured to:
   receive channel information from the terminal; and
   determine the plurality of indicators based on the channel information.

* * * * *